United States Patent
Persson et al.

(10) Patent No.: US 11,818,615 B2
(45) Date of Patent: Nov. 14, 2023

(54) USER EQUIPMENT, SOURCE ACCESS NODE, TARGET ACCESS NODE, AND METHODS IN A WIRELESS COMMUNICATIONS NETWORK FOR HANDLING DATA PACKETS IN A HANDOVER

(71) Applicant: Telefonaktiebolaget LM Ericsson (publ), Stockholm (SE)

(72) Inventors: Claes-Göran Persson, Mjölby (SE); Paul Schliwa-Bertling, Ljungsbro (SE); Johan Rune, Lidingö (SE); Pontus Wallentin, Linköping (SE); Pradeepa Ramachandra, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 355 days.

(21) Appl. No.: 17/286,546

(22) PCT Filed: Oct. 29, 2019

(86) PCT No.: PCT/SE2019/051078
§ 371 (c)(1),
(2) Date: Apr. 19, 2021

(87) PCT Pub. No.: WO2020/091674
PCT Pub. Date: May 7, 2020

(65) Prior Publication Data
US 2021/0345205 A1      Nov. 4, 2021

Related U.S. Application Data

(60) Provisional application No. 62/753,958, filed on Nov. 1, 2018.

(51) Int. Cl.
H04W 36/02 (2009.01)
H04W 36/00 (2009.01)
H04W 74/08 (2009.01)

(52) U.S. Cl.
CPC ...... H04W 36/023 (2013.01); H04W 36/0011 (2013.01); H04W 74/0833 (2013.01)

(58) Field of Classification Search
CPC .......... H04W 36/023; H04W 36/0011; H04W 74/0833; H04W 36/0033
See application file for complete search history.

(56) References Cited

U.S. PATENT DOCUMENTS 10,687,263 B2 *  6/2020  Paladugu .............. H04W 76/27
10,945,168 B2 *  3/2021  Park ..................... H04W 36/36
(Continued)

FOREIGN PATENT DOCUMENTS

KR    20200051045 A  *  9/2019    ........ H04W 36/0069
WO    2018128452 A1     7/2018

OTHER PUBLICATIONS

International Search Report and Written Opinion dated Dec. 13, 2019 for International Application No. PCT/SE2019/051078 filed Oct. 29, 2019, consisting of 13-pages.

(Continued)

*Primary Examiner* — Ahmed Elallam
(74) *Attorney, Agent, or Firm* — Christopher & Weisberg, P.A.

(57) ABSTRACT

A method performed by a target access node for handling data packets in a handover of a User Equipment, UE, from a source cell served by a source access node, to a target cell, served by the target access node in a wireless communications network is provided. The target access node receives a status report of last received data packet in the UE from the source access node. The target access node performs a data (Continued)

packet duplication check based on the information comprised in the status report. The target access node then sends to the UE, only data packets which have not already been received by the UE from the source access node, based on the outcome of the duplication check.

18 Claims, 19 Drawing Sheets

(56) References Cited

U.S. PATENT DOCUMENTS

| | | | |
|---|---|---|---|
| 11,129,067 B2* | 9/2021 | Kim | H04W 36/00835 |
| 2009/0196191 A1 | 8/2009 | Fischer | |
| 2014/0126542 A1 | 5/2014 | Chaponniere et al. | |
| 2015/0181481 A1* | 6/2015 | Masini | H04W 36/0085 455/436 |
| 2019/0253945 A1* | 8/2019 | Paladugu | H04W 12/033 |
| 2020/0154331 A1* | 5/2020 | Yang | H04W 36/00 |
| 2020/0245401 A1* | 7/2020 | Ingale | H04W 36/14 |

OTHER PUBLICATIONS

3GPP TSG-RAN WG2 Meeting #103bis R2-1814206; Title: LTE Mobility Enhancements, Agenda Item: 12.3.2; Source: Qualcomm Incorporated; WID/SID: Even further Mobility enhancements in E-UTRAN (LTE_feMob-core)—Release 16; Document for: Discussion and Decision; Date and Location: Oct. 8-12, 2018, Chengdu, China, consisting of 9-pages.
3GPP TSG-RAN WG3 Meeting #92 R3-161144; Title: Discussion on data forwarding in mobility enhancement solutions; Agenda Item: 20; Source: ZTE Corporation; Document for: Discussion and Approval; Date and Location: May 23-27, 2016, Nanjing, China, consisting of 5-pages.
3GPP TS 38.323 V15.3.0; 3rd Generation Partnership Project; Technical Specification Group Radio Access Network; NR; Packet Data Convergence Protocol (PDCP) specification (Release 15), Sep. 2018, consisting of 26-pages.
3GPP TS 38.300 V15.3.1; 3rd Generation Partnership Project; Technical Specification Group Radio Access Network; NR; NR and NG-RAN Overall Description; Stage 2 (Release 15), Oct. 2018, consisting of 92-pages.
3GPP TS 36.300 V15.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 15), Sep. 2018, consisting of 358-pages.
3GPP TS 36.323 V15.3.0; 3rd Generation Partnership Project; Technical Specification Group Radio Access Network; Evolved Universal Terrestrial Radio Access (E-UTRA); Packet Data Convergence Protocol (PDCP) specification (Release 15), Mar. 2019, consisting of 52-pages.
3GPP TS 36.331 V15.3.0; 3rd Generation Partnership Project; Technical Specification Group Radio Access Network; Evolved Universal Terrestrial Radio Access (E-UTRA); Radio Resource Control (RRC); Protocol specification (Release 15), Sep. 2018, consisting of 918-pages.
3GPP TS 36.881 V14.0.0; 3rd Generation Partnership Project; Technical Specification Group Radio Access Network; Evolved Universal Terrestrial Radio Access (E-UTRA); Study on latency reduction techniques for LTE (Release 14), Jun. 2016, consisting of 172-pages.
EPO Communication dated May 3, 2023 for Patent Application No. 19802319.4 consisting of 7-pages.

* cited by examiner

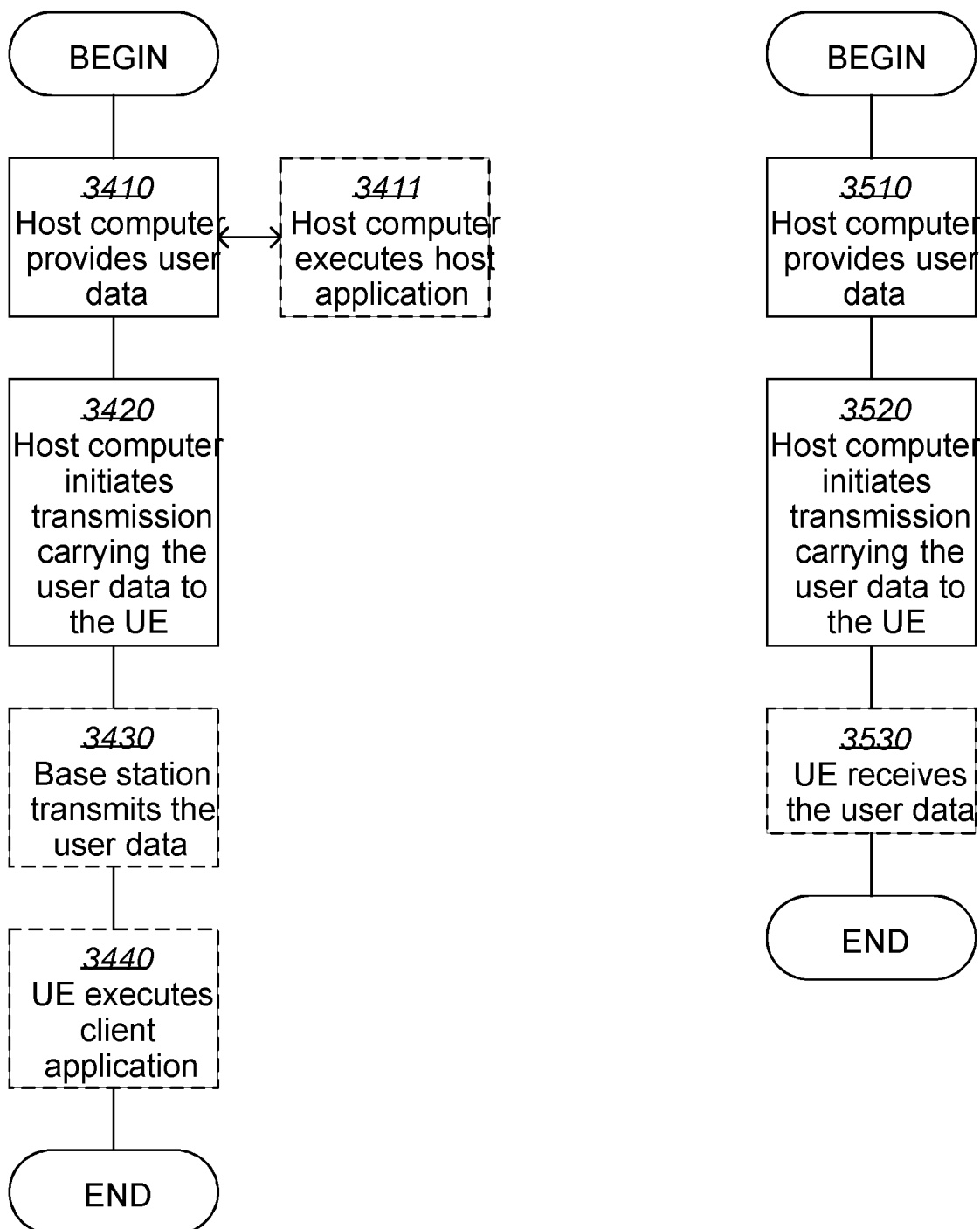

USER EQUIPMENT, SOURCE ACCESS NODE, TARGET ACCESS NODE, AND METHODS IN A WIRELESS COMMUNICATIONS NETWORK FOR HANDLING DATA PACKETS IN A HANDOVER

CROSS-REFERENCE TO RELATED APPLICATIONS

This application is a Submission Under 35 U.S.C. § 371 for U.S. National Stage Patent Application of International Application No.: PCT/SE2019/051078, filed Oct. 29, 2019 entitled "USER EQUIPMENT, SOURCE ACCESS NODE, TARGET ACCESS NODE, AND METHODS IN A WIRELESS COMMUNICATIONS NETWORK FOR HANDLING DATA PACKETS IN A HANDOVER," which claims priority to U. S. Provisional Application No. 62/753, 958, filed Nov. 1, 2018, the entireties of both of which are incorporated herein by reference.

TECHNICAL FIELD

Embodiments herein relate to a source access node, a User Equipment (UE), a target access node, and methods therein. In particular, they relate to handling data packets in a handover of the UE from a source cell served by the source access node, to a target cell served by the target access node in a wireless communications network.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Wireless Communication Systems in 3GPP

Consider the simplified wireless communication system illustrated in FIG. 1, with a UE 102, which communicates with one or multiple access nodes 103-104, which in turn is connected to a access node 106. The access nodes 103-104 are part of the radio access network 10.

For wireless communication systems pursuant to 3GPP Evolved Packet System, EPS, also referred to as Long Term Evolution, LTE, or 4G, standard specifications, such as specified in 3GPP TS 36.300 and related specifications, the access nodes 103-104 corresponds typically to an Evolved NodeB (eNB) and the access node 106 corresponds typically to either a Mobility Management Entity (MME) and/or a Serving Gateway (SGW). The eNB is part of the radio access network 10, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, such as specified in 3GPP TS 38.300 and related specifications, on the other hand, the access nodes 103-104 corresponds typically to an 5G NodeB (gNB) and the access node 106 corresponds typically to either a Access and Mobility Management Function (AMF) and/or a User Plane Function (UPF). The gNB is part of the radio access network 10, which in this case is the NG-RAN (Next Generation Radio Access Network), while the AMF and UPF are both part of the 5G Core Network (5GC).

Mobility in RRC_CONNECTED in LTE and NR

A UE in RRC_CONNECTED state may be configured by the network to perform measurements of serving and neighbor cells and based on the measurement reports sent by the UE, the network may decide to perform a handover of the UE to a neighbor cell. The network then sends a Handover Command message to the UE (in LTE an RRCConnection-Reconfiguration message with a field called mobilityControlInformation and in NR an RRCReconfiguration message with a reconfigurationWithSync field).

The reconfiguration of the UE is prepared by the target access node upon a request from the source access node (Handover Request message sent over X2 interface in case of EUTRA-EPC or Xn interface in case of EUTRA-5GC or NR) and takes into account the existing RRC configuration the UE has in the source cell (which is provided to the target access node in the Handover Request message). The reconfiguration parameters provided by the target access node (such as a target eNB/gNB), contains, for example, information needed by the UE to access the target cell, e.g., random access configuration, a new C-RNTI assigned by the target access node and security parameters enabling the UE to calculate new security keys associated to the target cell so that the UE can send a Handover Complete message on SRB1 (encrypted and integrity protected) based on new security keys upon accessing the target access node.

FIGS. 2 a, b and c summarize the signalling flow between the UE 102, the source access node 103 (also known as source gNB or source cell) and the target access node 104 (also known as target gNB or target cell) during a handover procedure, using 5G/NR as example. FIG. 2a depicts the handover preparation of the handover procedure, FIG. 2b depicts the handover execution of the handover procedure, and FIG. 2c depicts the handover completion of the handover procedure.

Although the signaling flow in FIGS. 2a, 2b and 2c shows a handover scenario in 5G/NR, there are some general and common principles for UEs performing handover (or in more general terms, mobility in RRC_CONNECTED) in LTE and NR:

Mobility in RRC_CONNECTED is Network-controlled as the network has best info regarding current situation such as load conditions, resources in different nodes, available frequencies, etc. Network may also take into account the impact from other UEs served by the network, e.g. from a resource allocation perspective. The AMF (Access and Mobility management Function) may provide the access nodes (such as eNBs and gNBs) with mobility-control information, as in step 0 in FIG. 2a.

The Network prepares a target access node 104 before the UE accesses that node. The source access node 103 provides the UE with the RRC configuration to be used in the target access node 104, including SRB1 configuration to be used when the UE sends the HO Complete message (also known as the RRCConnectionReconfigurationComplete message in LTE and as the RRCReconfigurationComplete message in NR) in the target access node 104.

A new C-RNTI is allocated by the target access node 104 and provided to the UE in the Handover Command message. The UE identifies itself by conveying the C-RNTI in MSG3 in the HO Complete message. Hence, there is no need for UE context fetching in the target node, unless a failure occurs.

To speed up the handover, source access node 103 provides the UE with information how to access the target access node 104 e.g. RACH configuration, so the UE does not have to acquire System Information prior to the handover.

The UE may be provided with contention-free random access (CFRA) resources, i.e. in that case the target access node 104 identifies the UE from the preamble in MSG1. The principle is that the handover procedure can always be optimized with network pre-allocated resources.

Security is prepared before the UE accesses the target access node 104 i.e. keys must be refreshed before sending the encrypted and integrity protected HO Complete message so UE can be verified to the target access node 104.

Both full and delta reconfiguration are supported so that the HO command can be minimized.

Mobility Enhancements for LTE and NR and Make-Before-Break

Two new work items for mobility enhancements in LTE and NR have started in 3GPP in release 16. The main objectives of the work items are to improve the robustness 35 at handover and to decrease the interruption time at handover.

Handover interruption time is typically defined as the time from the UE stops transmission/reception with the source access node 103 (eNB/gNB) until the target access node 104 (eNB/gNB) resumes transmission/reception with the UE.

In LTE pre-Rel-14, according to 3GPP TR 36.881, the handover interruption time is at least 45 ms. In LTE and NR, different solutions to decrease the handover interruption time have since then been discussed. Improvements are driven for example by new service requirements on low latency (e.g. aerial, industrial automation, industrial control) for which low interruption time shall be guaranteed.

As an example of one such improvement, Make-Before-Break (MBB) was introduced in LTE Rel-14 in purpose to shorten handover interruption time as close to 0ms as possible. Please see FIG. 3.

MBB as specified in LTE Rel-14 (3GPP TS 36.300 and TS 36.331) has some known limitations:

The connection to the source access node 103 is only maintained until the UE executes initial uplink transmission in the target access node 104, i.e. the UE releases the connection to the source cell before the connection to the target access node is ready for packet transmission/reception, see arrows marked with L3, in FIG. 3.

3GPP TS 36.300 and TS 36.331 do not clearly specify when UE can switch from Source access node 103 to Target access node 104 for DL/UL data transfer.

It is designed for UEs with single Tx/Rx radio chain. Such a UE can typically not maintain simultaneous DL/UL data transfer with Source access node and at the same time switch from Source access node 103 to Target access node 104 without any user 30 plane interruption.

There is no clear mechanism defined for how long Source access node 103 will continue to transfer DL data during HO execution. In worst case the Source access node 103 will continue to transfer DL data to the UE until it receives the UE Context Release message in step 17 in FIG. 3.

How DL Data transfer can be handled without interruption (& reliably) during Packet Data Convergence Protocol (PDCP) Anchor switch from Source access node 103 to Target access node 104 is not specified.

HO reliability & robustness enhancements are not considered.

It is limited to intra-frequency, synchronous and same bandwidth carrier frequency for both source access node 103 and target access node 104.

Improvements to the LTE Rel-14 make-before-break handover have been proposed in the past. Some of these improvements would benefit from UEs with dual Tx/Rx radio chain (such a UE has dual radio transmitters and receivers and associated dual user plane protocol stacks). One example of such proposed improvement is shown in FIGS. 4a and 4b. FIG. 4a depicts handover preparation and a part of handover execution of the handover process. FIG. 4b depicts continuation of the handover execution and handover completion of the handover process. With these proposed improvement to the handover procedure, the handover execution phase is somewhat extended compared to a legacy handover. In a legacy handover, the handover completion phase starts when the UE sends the Handover Complete message.

In FIG. 4a, Reference 401 depicts parallel DL/UL Data Transfer with SeNB such as the source access node 103 and HO execution using 2nd L1/L2 stack. Reference 402 depicts HO preparation, and reference 403 depicts HO execution.

In FIG. 4b, Reference 404 depicts the continued HO execution, and reference 405 depicts HO completion.

Some highlights in this solution are:

At step 7, upon receiving the 'make-before-break' HO indication in the RRC Connection Reconfiguration Request message, UE maintains the connection to the source access node 103 even while establishing the connection to the target access node 104. That is, the UE can send and receive data via the source access node 103 between step 7-10 without any interruption. And after step 10, UE has the target link available for data Tx/Rx similar to the regular HO procedure.

Once the connection setup with the target access node 104 is successful, i.e. after sending the RRC Connection Reconfiguration Complete message in step 10, UE maintains one common PDCP entity but keeps dual Radio Link Control (RLC)/Media Access Control (MAC)/physical layer (PHY) stacks, one for the source access node 103 link and one for the target access node 104 link. After step 10, UE transmits the UL data on the target access node 104 similar to the regular HO procedures using the target access node 104 security keys. There is no need for UL data duplication to both nodes and it avoids UE Power splitting between 2 nodes and also simplifies UE implementation.

After UE sends the RRC Connection Reconfiguration Complete message, Target access node 104 will send X2 data forwarding indication (step 11) to source access node 103 and Source access node PDCP PDUs will be duplicated towards Target access node 104 (via X2 UP). Target access node PDCP will encrypt data received from Source access node 103. UE can then receive DL data from both the source and target access nodes simultaneously before source access node 103 connection is released. Optionally (based on network implementation) duplicating DL data transmission (i.e. sending the same PDCP PDUs from both nodes) during HO execution helps to reduce DL data interruption during HO execution (also helpful for additional link reliability and reduces latency of DL data delivery i.e. when one link is poor and without waiting for retransmission delay, the other link can deliver the same data faster without retransmission).

The UE needs to maintain the security context for both source access node 103 and target access node 104 until the source access node release request is received. UE can differentiate the security key to be used for a PDCP PDU based on the RLC/Media Access Control (MAC)/PHY stack from which the PDU is received.

UE releases the source access node connection as per the notification from the target access node 104 (step 17a).

SUMMARY

An object of embodiments herein is to improve the performance of a wireless communications network using handover.

According to an aspect of embodiments herein, the object is achieved by a method performed by a target access node for handling data packets in a handover of a User Equipment, UE, from a source cell served by a source access node, to a target cell, served by the target access node in a wireless communications network. The target access node receives a status report of last received data packet in the UE from the source access node. The target access node performs a data packet duplication check based on the information comprised in the status report. The target access node then sends to the UE, only data packets which have not already been received by the UE from the source access node, based on the outcome of the duplication check.

According to another aspect of embodiments herein, the object is achieved by a method performed by a User Equipment, UE, for assisting a target access node to handling data packets in a handover from a source cell served by a source access node, to a target cell served by a target access node, in a wireless communications network. the method comprising: when the handover is decided, the UE transmits a status report to the target access node. The status report relates to the last received data packet from the source access node. The status report assists the target access node to perform a data packet duplication check, to avoid sending data packets to the UE in the target cell that was already sent in the source cell.

According to another aspect of embodiments herein, the object is achieved by a method performed by a source network node for assisting a target access node in handling data packets in a handover of a User Equipment, UE, from a source cell served by a source access node, to a target cell, served by a target access node in a wireless communications network. When decided to perform the handover, the source network node transmits an instruction to the UE. The instruction instructs the UE to send a status report to the target access node. The status report shall relate to the last received data packet in the UE from the source access node. The status report assists the target access node to perform a data packet duplication check to avoid sending data packets to the UE in the target cell that was already sent in the source cell.

According to an aspect of embodiments herein, the object is achieved by a target access node for handling data packets in a handover of a User Equipment, UE, from a source cell served by a source access node, to a target cell served by a target access node, in a wireless communications network. The target access node being configured to:

The target access node receives a status report of last received data packet in the UE from the source access node. The target access node performs a data packet duplication check based on the information comprised in the status report. The target access node then sends to the UE, only data packets which have not already been received by the UE from the source access node, based on the outcome of the duplication check.

According to another aspect of embodiments herein, the object is achieved by a User Equipment, UE, for assisting a target access node to handling data packets in a handover from a source cell served by a source access node, to a target cell served by a target access node, in a wireless communications network. The UE is configured to: When the handover is decided, transmit, to the target access node, a status report of the last received data packet from the source access node, which status report is adapted to assist the target access node to perform a data packet duplication check to avoid sending data packets to the UE in the target cell that was already sent in the source cell.

According to another aspect of embodiments herein, the object is achieved by a source network node for assisting a target access node in handling data packets in a handover of a User Equipment, UE, from a source cell served by a source access node, to a target cell, served by a target access node in a wireless communications network. The source network node is configured to:

When decided to perform the handover, transmit a handover command to the UE. The handover command is adapted to comprise an instruction to send to the target access node a status report of the last received data packet in the UE from the source access node. The status report is adapted to assist the target access node to perform a data packet duplication check to avoid sending data packets to the UE in the target cell that was already sent in the source cell.

Since the target access node receives a status report of last received data packet in the UE from the source access node, the target access node is capable to perform a data packet duplication check based on the information in the status report. This results in that the target access node then sends to the UE, only data packets which have not already been received by the UE from the source access node, based on the outcome of the duplication check.

Some advantages of embodiments herein are that they provide reduced data latency such as application data latency by ensuring that the target access node sends only those data packets that are not yet received by the UE from the source access node and thus avoid packet duplication at the UE 120 such as the UE's PDCP. In addition, radio transmission resources are saved.

BRIEF DESCRIPTION OF THE DRAWINGS

Examples of embodiments herein are described in more detail with reference to attached drawings in which:

FIGS. 15-18 are flowcharts illustrating methods implemented in a communication system including a host computer, a base station and a user equipment.

DETAILED DESCRIPTION

As a part of developing embodiments herein the inventors identified a problem which first will be discussed.

Some particular limitations of the existing make-before-break handover solutions, including previously proposed improvements, are:

While some proposed solutions are utilizing UEs with dual Tx/Rx chains, there is no reduction in handover interruption time achieved for UEs with single Tx/Rx chain, compared to LTE Rel-14.

Figure 1:
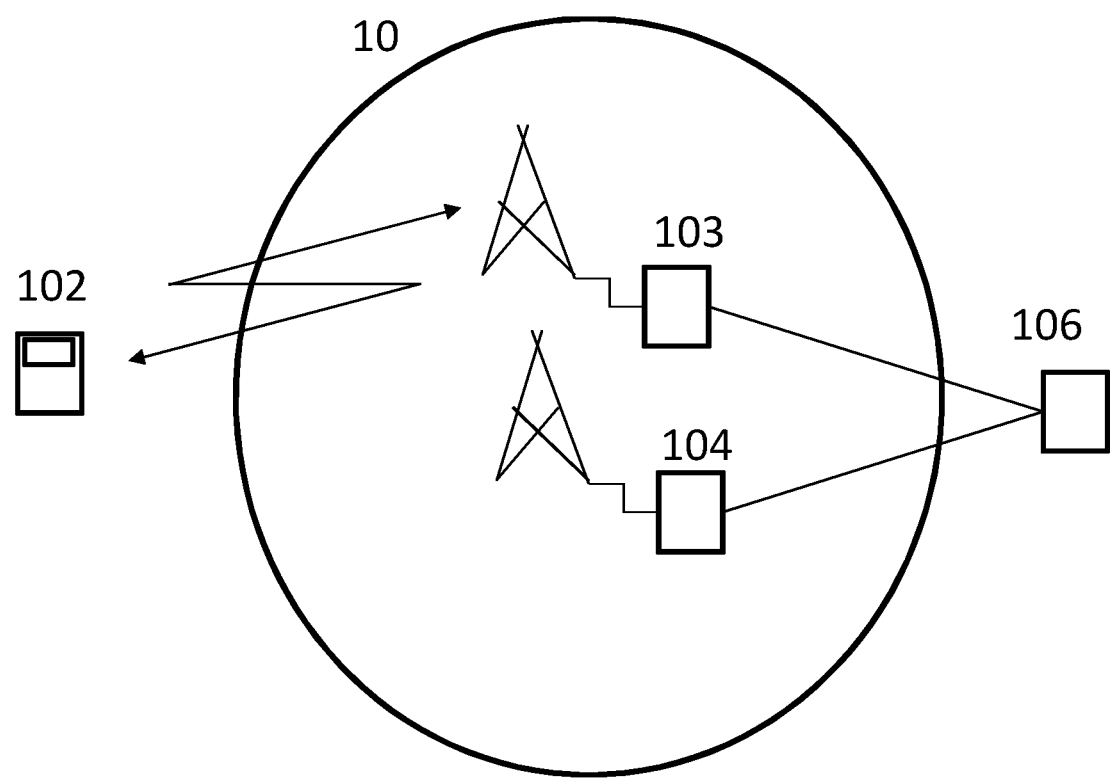
FIG. 1 is a schematic block diagram illustrating prior art.
Figure 2A:
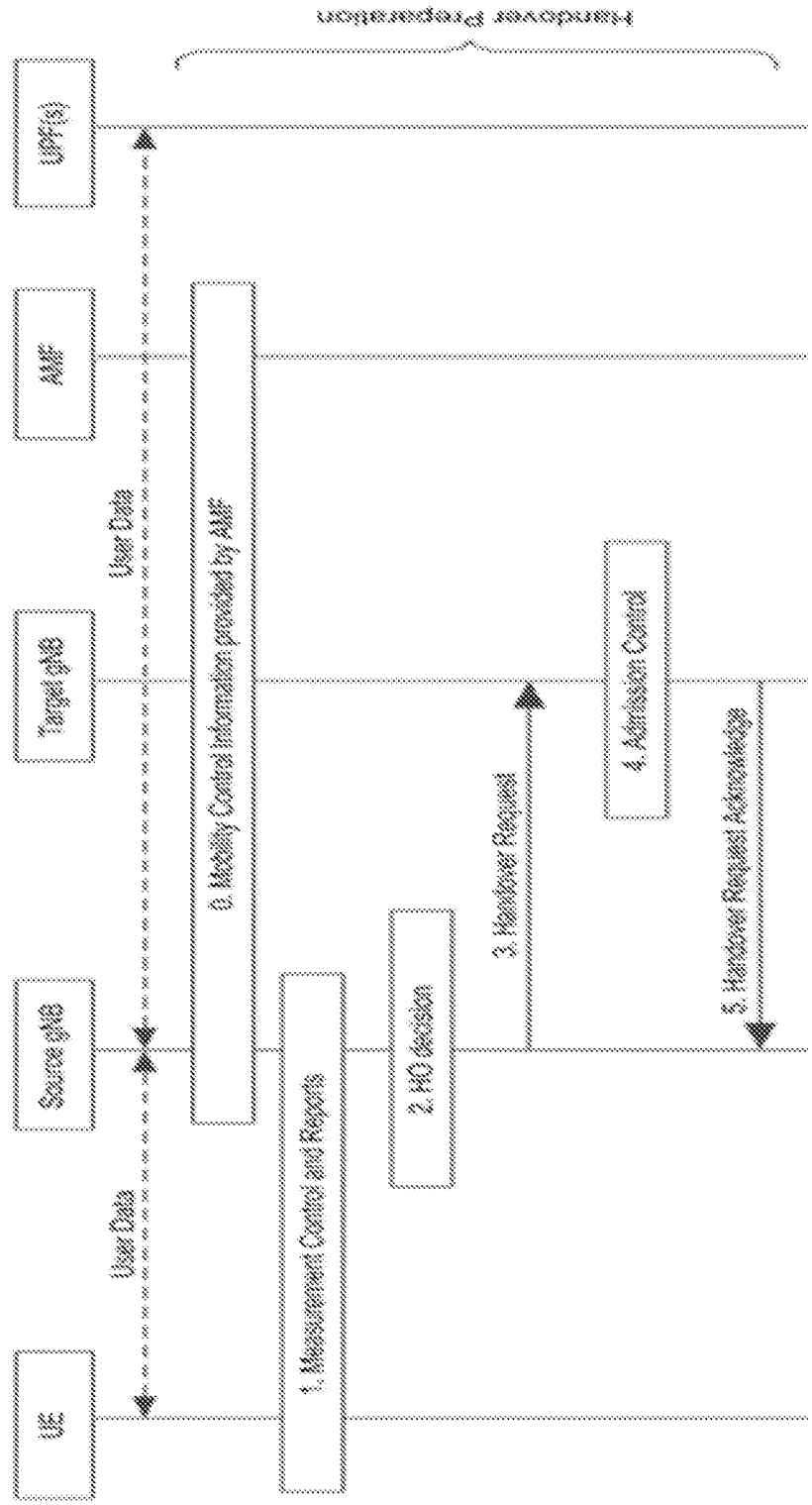
FIGS. 2 *a, b*, and *c* are schematic sequence diagrams illustrating prior art.
Figure 2B:
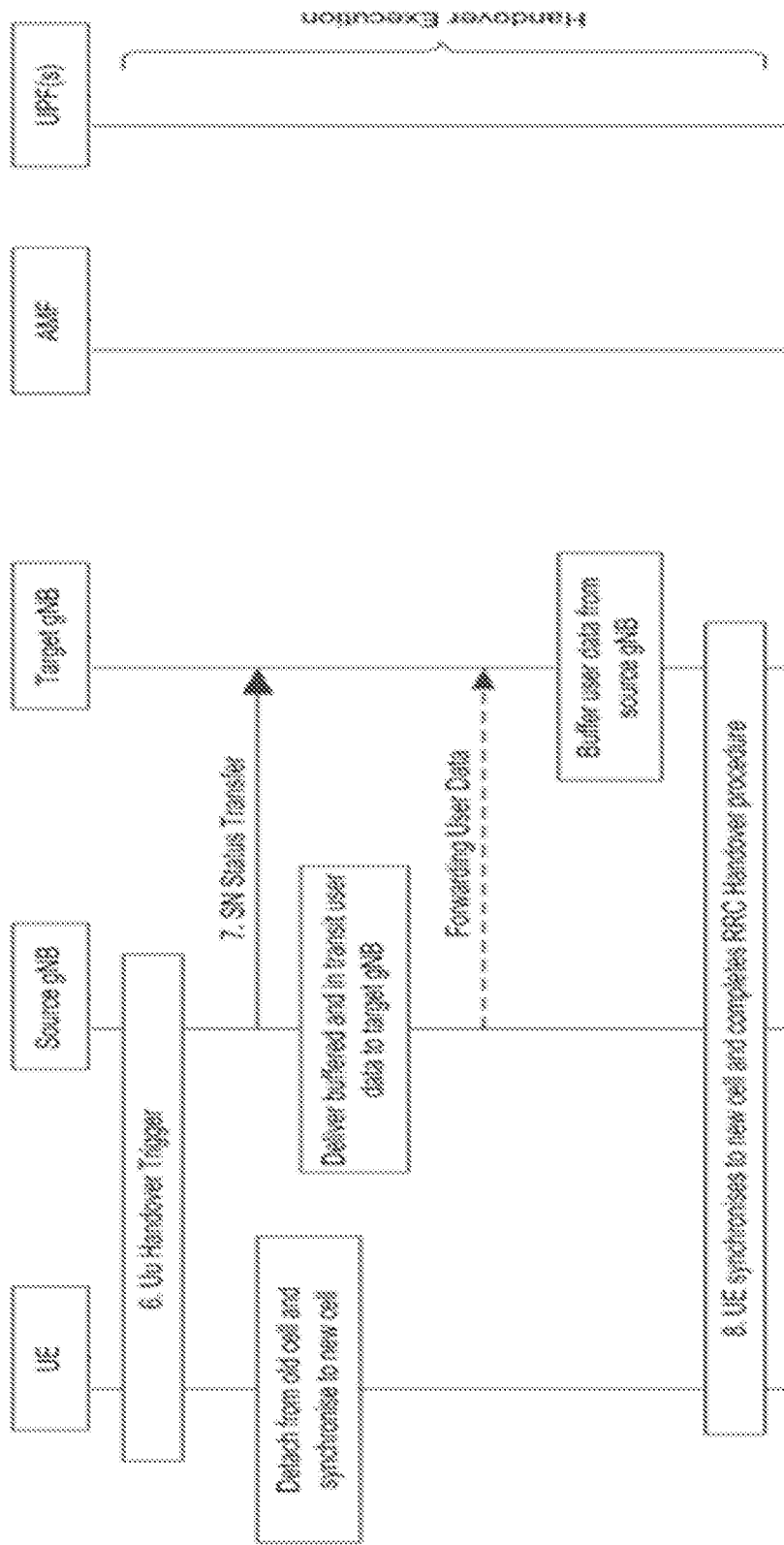
Figure 2C:
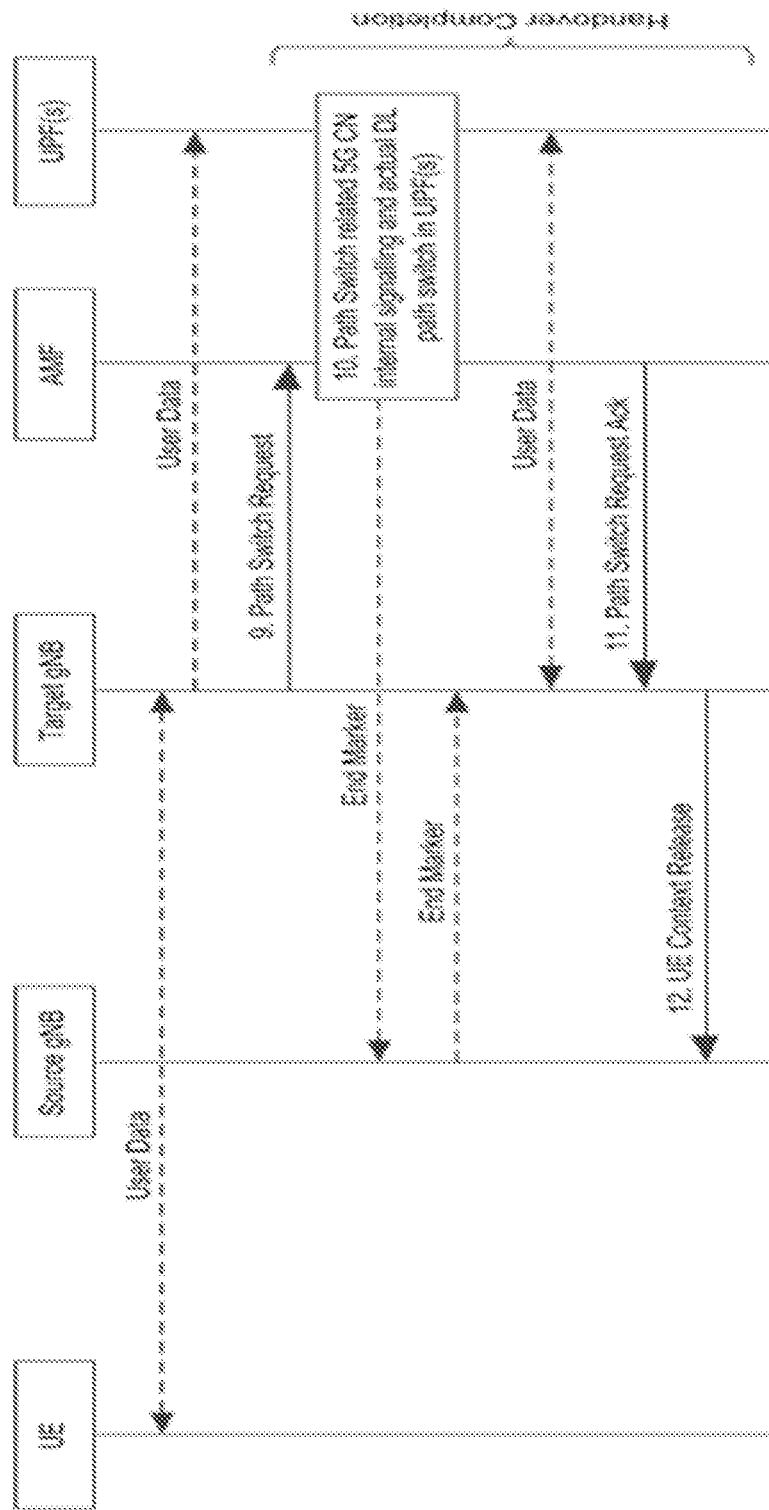
Figure 3:
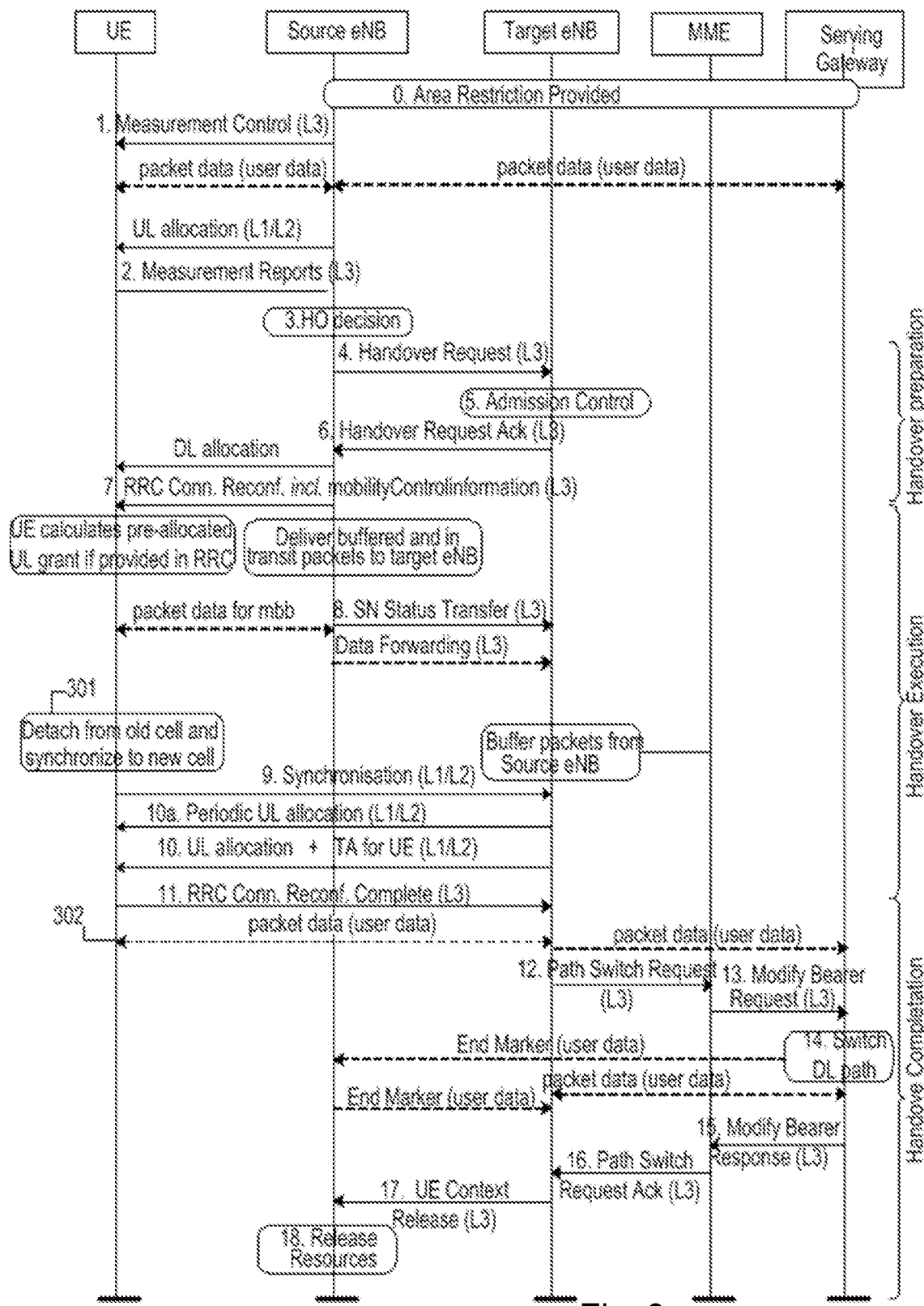
FIG. 3 is a schematic sequence diagram illustrating prior art.
Figure 4A:
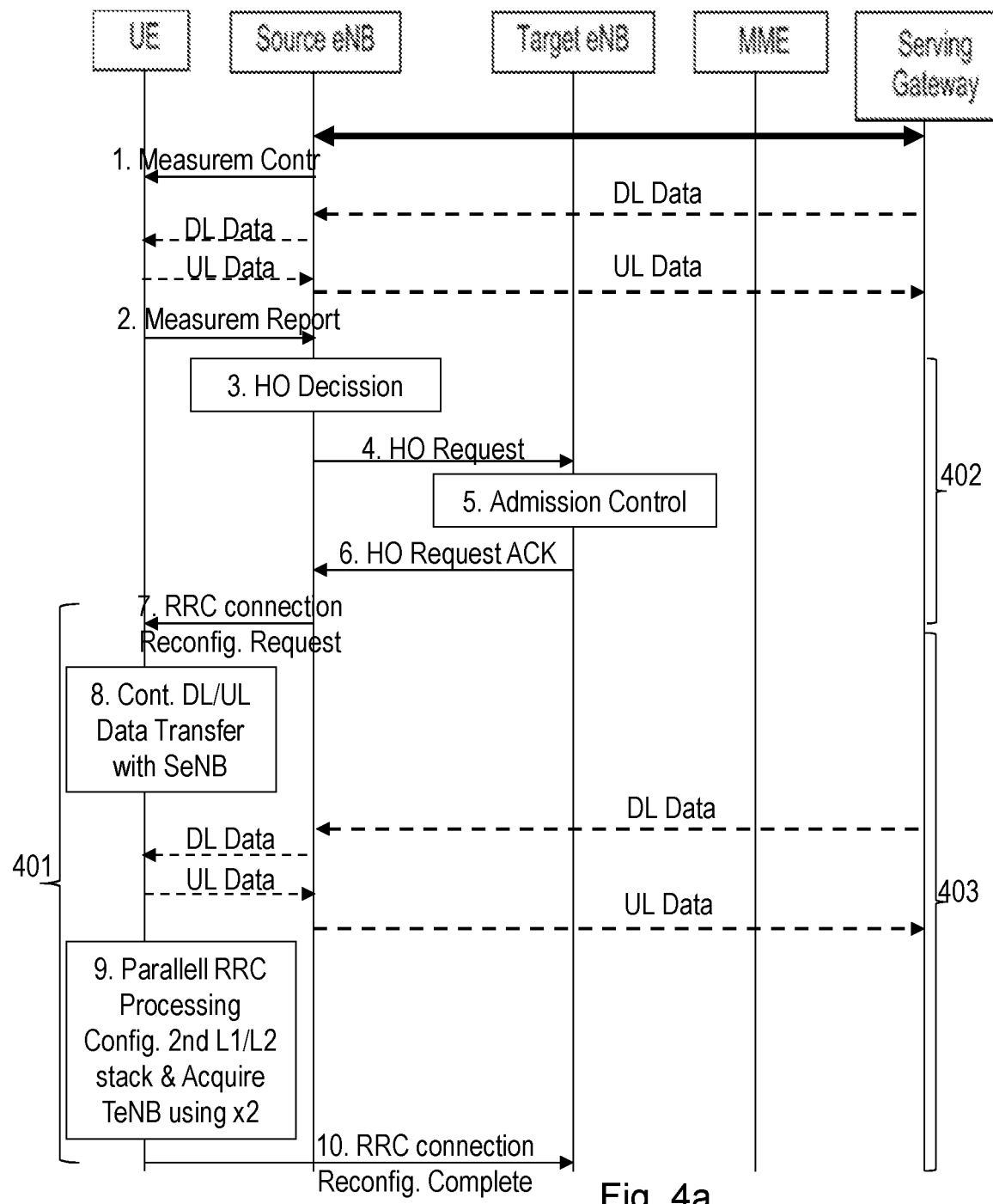
FIGS. 4 *a* and *b* are schematic sequence diagrams illustrating prior art.
Figure 4B:
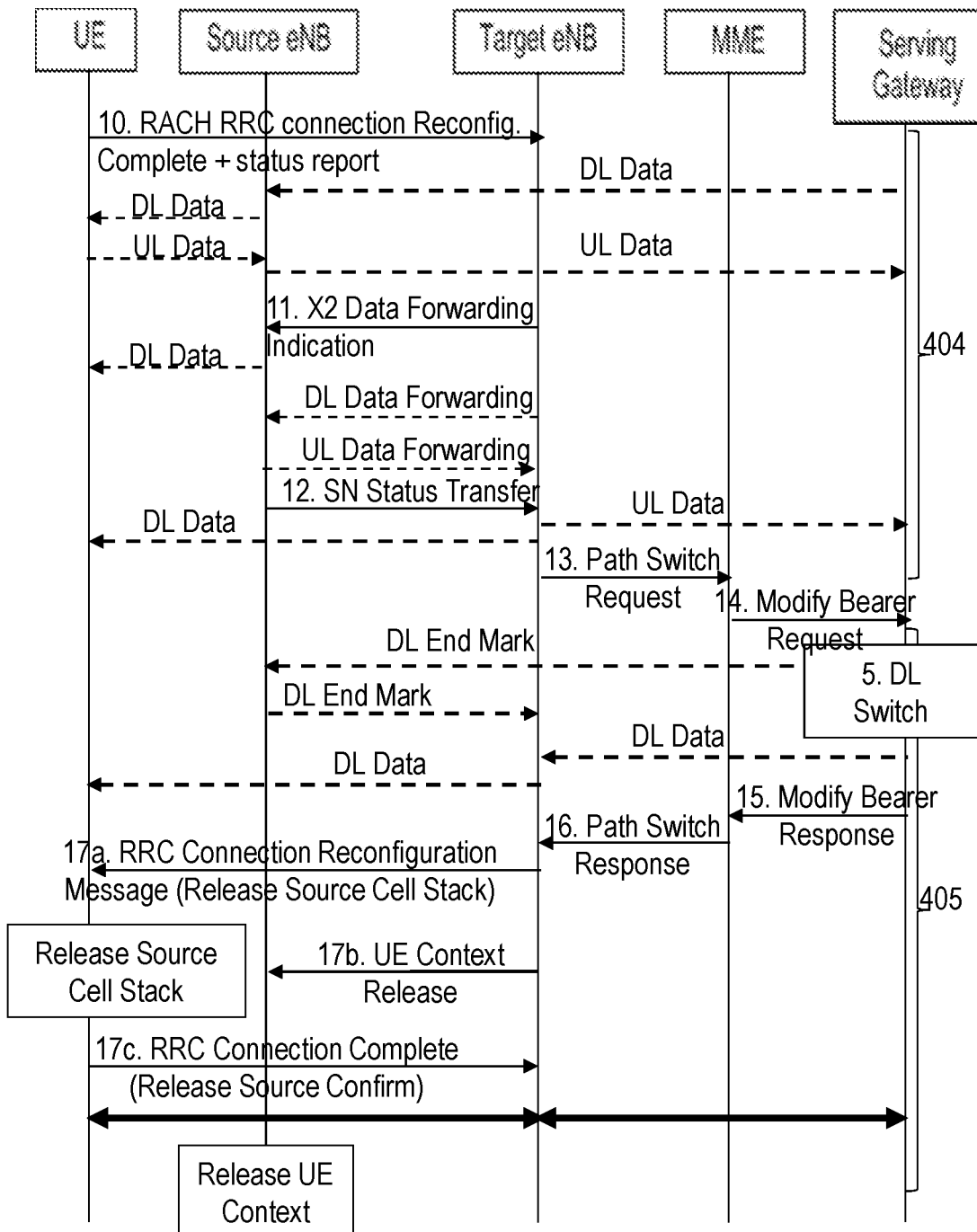

The Release 14 MBB solution reduces the interruption time to theoretically 0ms in uplink. However, in the improved MBB procedure as described in FIG. 4, there will be a delay in the DL data transfer since the DL packets starts to be forwarded from the source access node only after the UE has sent the RRCConnection-ReconfigurationComplete to the target eNB.

The same PDCP PDUs may be sent from source access node and target access node during Handover (HO) execution phase, i.e. the UE need to perform duplication check of received packets. The effect of this is increased application data latency in the DL and waste of radio transmission resources.

Thus, there is a need to reduce the delay during a handover, e.g. as seen by the application and/or service.

An object of embodiments herein is to improve the performance of a wireless communications network using handover.

Embodiments herein provide methods to avoid sending data packets such as DL data to a UE 120 from a target access node 112, which was already received by the UE 120 from a source access node 111. Hence the packet data such as the (PDCP) packet data duplication check is "moved" from the UE 120 to the network such as the target access node 112 during the Handover Execution phase.

The UE 120 sends a status report to the target access node 112. The status report comprises information about the last received data packet from the source access node. This may e.g. be a PDCP Sequence Number (SN) of the last PDCP packet received from source access node in a PDCP status report to the target access node. The target access node 112 may use the information included in the status report to perform a data packet duplication check and thus avoid sending data packets to the UE 120 which were already received by the UE 120 in the source cell. For example, the target access node 112 may use the information included in the PDCP status report to perform a PDCP duplication check and thus avoid sending data packets such as PDCP packets to the UE 120 which were already received by the UE 120 in the source cell 115.

The wordings packet data and data packets may be used interchangeably herein.

The UE 120 is informed and/or instructed by the source access node 111 to send a status report to the target access node 112 during or immediately after the random-access procedure. For example, UE 120 may be informed by the source access node 111 in a message such as a handover command message, also known as RRCConnectionReconfiguration message in LTE, to send a PDCP status report to the target access node 112 e.g. during or immediately after the random-access procedure.

The status report e.g. the PDCP status report, comprising information about the last received data packet from the source access node 111, such as the PDCP SN of the last PDCP packet received from source access node 111, may be sent to the target access node 112 in a message such as e.g. in msg-3 or in msg-5 of the random-access procedure.

In some embodiments, the source access node 111 may request the target access node 112 to reserve UL resources for the PDCP status report in either msg-3 or in msg-5 of the random-access procedure. Early reservation of UL resources in the target access node 112 for the PDCP status report is an advantage since the UE 120 then does not need to request for UL resources for the PDCP status report during the random-access procedure, resources which may not be available in the target access node 112 at that point in time. The request may be included in Handover Request message sent to the target access node 112 during the Handover Preparation phase.

Some advantages of embodiments herein is that they provide reduced data latency such as application data latency by ensuring that the target access node 112 sends only those data packets that are not yet received by the UE 120 from the source access node 111 and thus avoid packet duplication at the UE 120 such as the UE's PDCP. In addition, radio transmission resources are saved.

Figure 5:
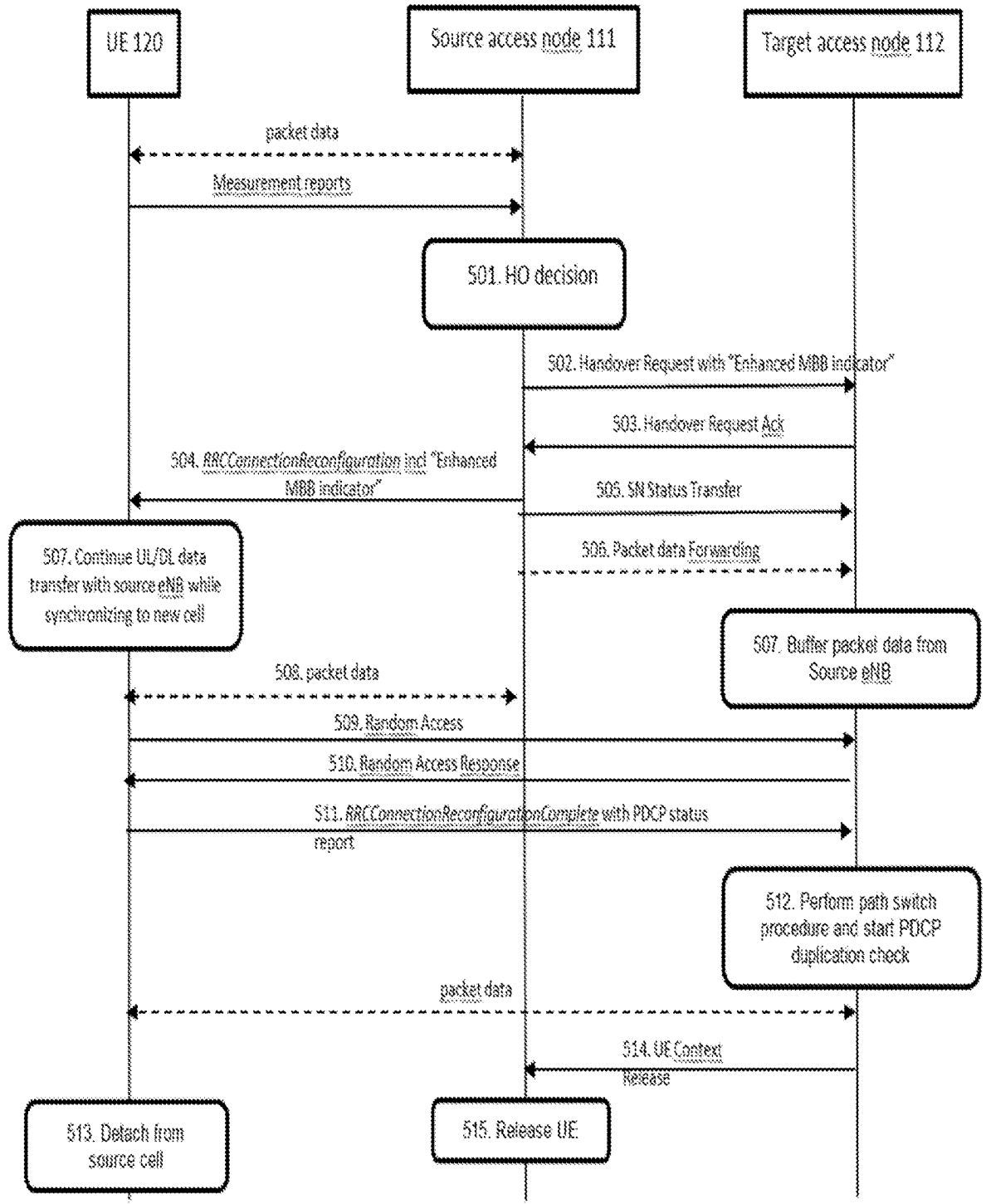
FIG. 5 is a sequence diagram depicting embodiments of a method.

An example of embodiments is depicted in FIG. 5 comprising any one or more of the below example actions referred to as steps in the text below:

According to an example, some steps of embodiments of a method are illustrated in FIG. 5. FIG. 5 depicts an example using enhanced MBB with packet duplication check in the target access node 112. It should be understood that all steps need not be taken and that the steps may be taken in any suitable order.

Step 501: Based on one or more Measurement reports received from the UE 120 in the source cell 115, the source access node 111 decides to handover the UE 120 to a neighbour cell, the target cell 116, controlled by the target access node 112.

Step 502: The source access node 111 sends a Handover Request message 30 comprising an "Enhanced MBB indicator" to the target access node 112. Based on the "Enhanced MBB indicator", the target access node 112 reserves UL resources for the PDCP status report (as defined in 3GPP TS 36.323), or a similar report informing the target access node 112 of the last data packet such as PCDP SDU Sequence Number (SN) received by the UE 120 in the source cell 115, are reserved by the target access node 112. This step relates to Actions 801, 901 and 902 described below.

Step 503: The target access node 112 confirms the handover request (and by that the reserved UL resources) by sending a HO Request Acknowledge message to the source access node 111. The message may include a transparent container to be sent to the UE 120 including e.g. a new C-RNTI, target access node 112 security algorithm identifiers for the selected security algorithms etc. The container may also comprise an "Enhanced MBB indicator".

Step 504: The source access node 111 sends a message such as a Handover Command (e.g. RRCConnectionReconfiguration message with mobifityControlInfo in LTE) to the UE 120. The message may comprise an "Enhanced MBB indicator", requesting the UE 120 to send a status report such as a PDCP status report, or a similar report informing the target access node 112 of the last data packet such as PCDP SDU SN received by the UE 120 in the source cell 115, in a message such as an RRCConnectionReconfigurationComplete message when accessing the target access node 112. This step relates to Actions 701 and 802 described below.

Step 506: The source access node 111 starts forwarding packet data to the target access node 112 and continues to send and receive data to/from the UE 120 (in step 508). The packet data is also referred to as data packets herein and may be used interchangeably.

Step 507 in the UE 120: The UE 120 continues with UL/DL data transfer with source eNB such as the source access node 111, while synchronizing to the new cell such as the target cell 116.

Step 507 in the target access node 112: The Packet data, such as data packets, to be sent to the UE 120 is received and buffered in the target access node 112.

Step 508: The Packet data such as data packets, to and from the UE 120 is still sent and received via the source access node 111.

Step 509-510: The UE 120 performs random-access in the target cell 116 and target access node 112 schedules uplink resources in the target cell 116 based on the request from the source access node 111 in step 502.

At this point, the target access node 112 may also request the source access node 111 to stop transmitting packet data downlink to the UE 120 (not shown in FIG. 5). This step relates to Action 902 described below.

Step 511: The UE 120 sends RRCConnectionReconfigurationComplete to the target access node 112 with a status report such as the PDCP status report (or a similar report informing the target access node 112 of the last PCDP SDU SN received by the UE 120) included in the message. This status report such as the PDCP status report is e.g. sent as response to the received "Enhanced MBB indicator" in the received RRCConnectionReconfiguration message in step 504. The UE 120 may optionally replace the uplink Buffer Status Report, optionally included in the RRCConnectionReconfigurationComplete message, with e.g. the PDCP status report, for instance if there is no space for both the uplink Buffer Status Report and the PDCP status report in the RRCConnectionReconfigurationComplete message. Alternatively, the value of the "Enhanced MBB indicator" in the RRCConnectionReconfiguration message may correspondingly instruct the UE 120 how to transmit the PDCP status report and buffer status report along with the RRCConnectionReconfigurationComplete message, or alternatively in a different RRC message or in a MAC uplink control PDU after the RRCConnectionReconfigurationComplete message has been sent. This is also in order to match the UL resources previously reserved by the target access node 112 in step 502.

This step relates to Actions 702 and 903 described below.

Step 512: The target access node 112 may now start to send the buffered data packets such as PDCP packets to the UE 120 (also the UE 120 may now start to send UL data via the target cell). Based on the PDCP status report received from the UE 102 (in step 511), the target access node 112 performs a PDCP duplication check in order to avoid sending duplicate PDCP packets to the UE, i.e. PDCP packets which were already received by the UE 102 in the source cell 115.

The target access node 112 may also send a Path Switch Request message to the Core Network to inform that the UE 120 has changed cell.

This step relates to Action 904 and 905 described below.

Step 513: The UE 120 detaches from source cell 115.

Step 514: The target access node 112 informs source access node 111 to release UE 120 Context.

Step 515: The source access node 111 releases UE 120 Context.

Figure 6:
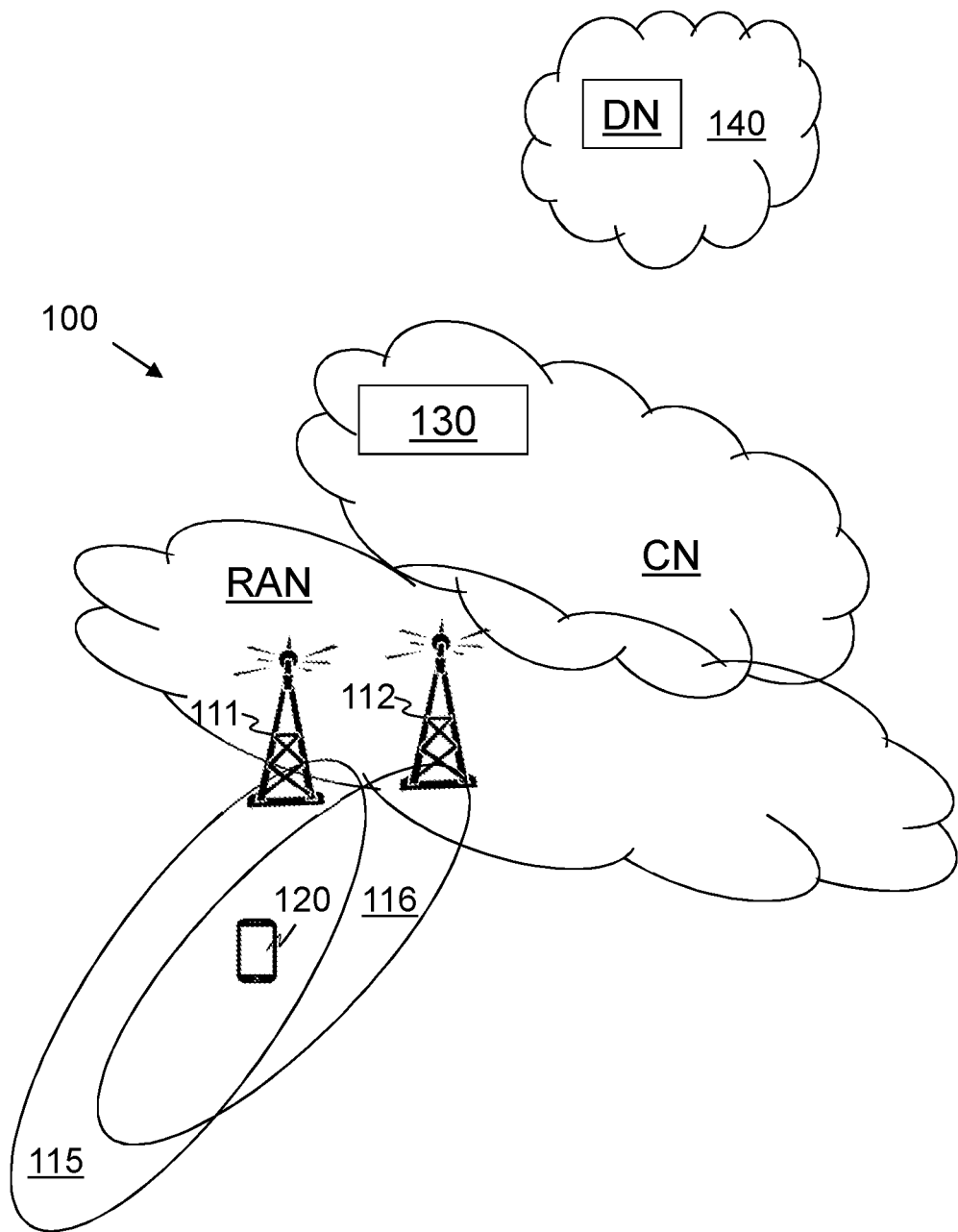
FIG. 6 is a schematic block diagram illustrating embodiments of a wireless communications network.

Embodiments herein relate to wireless communication networks in general. FIG. 6 is a schematic overview depicting a wireless communications network 100 wherein embodiments herein may be implemented. The wireless communications network 100 comprises one or more RANs and one or more CNs. The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Access nodes operate in the wireless communications network 100 such as the source access node 111 and the target access node 112. The source access node 111 provides radio coverage over a geographical area, a service area referred to as the source cell 115, which may also be referred to as a beam or a beam group of a first radio access technology (RAT), such as 5G, LTE, Wi-Fi or similar. The target access node 112 also provides radio coverage over a geographical area, a service area referred to as the target cell 116, which may also be referred to as a beam or a beam group of a first radio access technology (RAT), such as 5G, LTE, Wi-Fi or similar. The first and second access nodes 111, 112 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the respective source and target access node 111, 112 depending e.g. on the first radio access technology and terminology used. The respective source and target access node 111, 112 may be referred to as serving radio access nodes and communicates with a UE with Downlink (DL) transmissions to the UE and Uplink (UL) transmissions from the UE.

A number of UEs operate in the wireless communication network 100, such as the UE 120. The UE 120 may be a mobile station, a non-access point (non-AP) STA, a STA, a user equipment and/or a wireless terminals, that communicate via one or more Access Networks (AN), e.g. RAN, e.g. via the source and/or target access nodes 111, 112 to one or more core networks (CN) e.g. comprising a CN node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may in a first aspect be performed by the UE 120 in a second aspect by the source access node 111, and in a third aspect by the target access node 112. As an alternative, a Distributed Node (DN) and functionality, e.g. comprised in a cloud 140 as shown in FIG. 6, may be used for performing or partly performing the methods.

Figure 7:
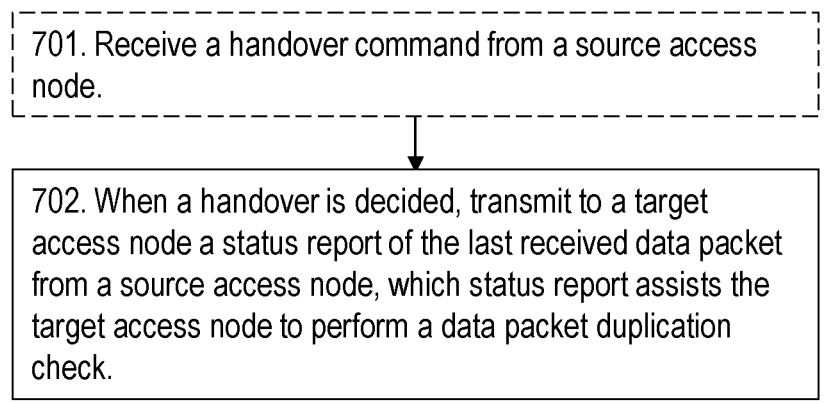
FIG. 7 is a flowchart depicting embodiments of a method in a user equipment.

FIG. 7 shows an example of a method in the UE 120 e.g. for assisting a target access node 112 to handling data packets in a handover from a source cell 115, e.g. served by a source access node 111, to a target cell 116, e.g. served by a target access node 112 in a wireless communications network 100.

According to an example scenario, the UE 120 is served in the source cell 115 and moves towards the target cell 116. The UE 120 is engaged in an ongoing communication with the wireless communication network 100 in the source cell 115 and a handover to the target cell 116 is needed.

The method comprises one or more of the following actions:

Action 701

The UE 120 may receive a handover command from the source access node 111. The handover command may e.g. be a RRCConnectionReconfiguration message with mobility-ControlInfo) to the UE 120. The message may comprise an "Enhanced MBB indicator", requesting the UE 120 to send a status report such as a PDCP status report, or a similar report informing the target access node 112 of the last data packet such as PCDP SDU SN received by the UE 120, in a message such as an RRCConnectionReconfigurationComplete message when accessing the target access node 112

The handover command may comprise an indicator instructing the UE 120 to send to the target access node 112 a status report of the last received data packet from the source access node 111. The status report may e.g. be a PDCP status report, and the indicator may e.g. be an enhanced make-before-break indicator.

This Action relates to step 504 described above.

Action 702

When the handover is decided, the UE 120 transmits to the target access node 112, e.g. as a response to handover command, a status report of the last received data packet from the source access node 111. The handover has been decided, e.g. when a handover command is received. The status report may be transmitted to the target access node 112 as a response to the handover command. The status report may e.g. be a PDCP status report. The handover may be decided in the source node and the decision to perform the handover may be conveyed to the UE 120 in a Handover Command. Then, e.g. when the handover is completed, the UE 120 transmits the status report to the target access node 112.

The status report assists the target access node 112 to perform a data packet duplication check, to avoid sending data packets to the UE 120 in the target cell 116 that was already sent in the source cell 115. It should be noted that to avoid sending data packets to the UE 120 in the target cell 116 that was already sent in the source cell 115 also covers to avoid sending data packets to the UE 120 that was not already received by the UE 120 in the source cell 115. This is since a data packet may be sent from the source access node 111 but without being properly received by the UE 120.

This Action relates to step 511 described above.

In some embodiments, the status report of the last received data packet from the source access node 111 is transmitted as a response to a received indicator in the received handover command from the source access node 111. The indicator may e.g. be an enhanced make-before-break indicator.

In some embodiments, the status report of the last received data packet from the source access node 111 is transmitted during or immediately after a random access procedure in the target cell 116.

In some embodiments, the status report of the last received data packet from the source access node 111 is comprised in any one out of: A MAC uplink control PDU or an RRC message.

The status report of the last received data packet from the source access node 111 may comprise the PDCP SN of the last PDCP packet received from the source access node 111.

Figure 8:
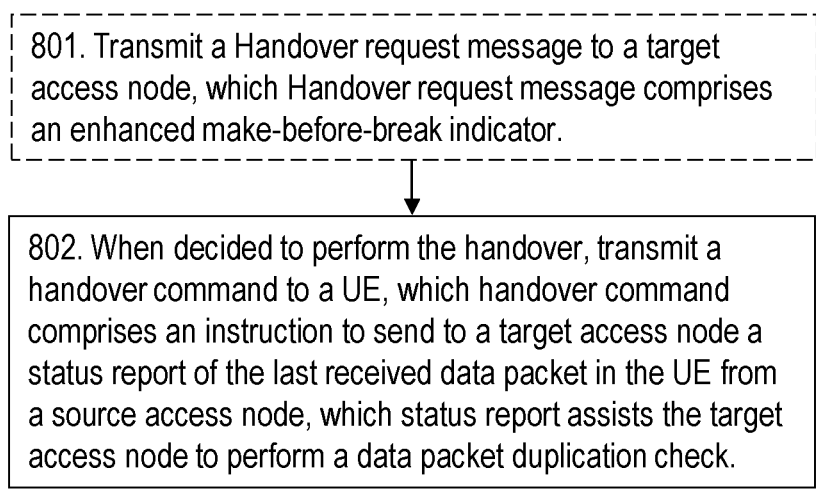
FIG. 8 is a flowchart depicting embodiments of a method in a source access node.

FIG. 8 shows an example method performed by the source access node 111 for assisting a target access node 112 in handling data packets, such as e.g. to perform data forwarding, in a handover of the UE 120 from a source cell 115 served by a source access node 111, to a target cell 116 served by a target access node 112 in a wireless communications network 100.

According to the example scenario, the UE 120 is served in the source cell 115 and moves towards the target cell 116. The UE 120 is engaged in an ongoing communication with the wireless communication network 100 in the source cell 115 and a handover to the target cell 116 is needed. According to the example scenario, the source access node 111 has decided to perform the handover.

The method comprises one or more of the following actions:

Action 801,

In this optional action, the source access node 111 may transmit message such as a Handover request message to the target access node 112. The Handover request message may comprise an enhanced make-before-break, MBB, indicator. This Action relates to step 502 described above.

Action 802

When decided to perform the handover, the source access node 111 sends an instruction to the UE 120, to send to the target access node 112 a status report of the last received data packet in the UE 120 from the source access node 111. E.g. the source access node 111 transmits a handover command to the UE 120. The handover command comprises the instruction to send to the target access node 112 a status report of the last received data packet in the UE 120 from the source access node 111, such as e.g. an indication to send PDCP status. The status report assists the target access node 112 to perform a data packet duplication check, to avoid sending data packets to the UE 120 in the target cell 116 that was already sent in the source cell 115. It should be noted that to avoid sending data packets to the UE 120 in the target cell 116 that was already sent in the source cell 115 also covers to avoid sending data packets to the UE 120 that was not already received by the UE 120 in the source cell 115. This is since a data packet may be sent from the source access node 111 but without being properly received by the UE 120.

This Action relates to step 504 described above.

Figure 9:
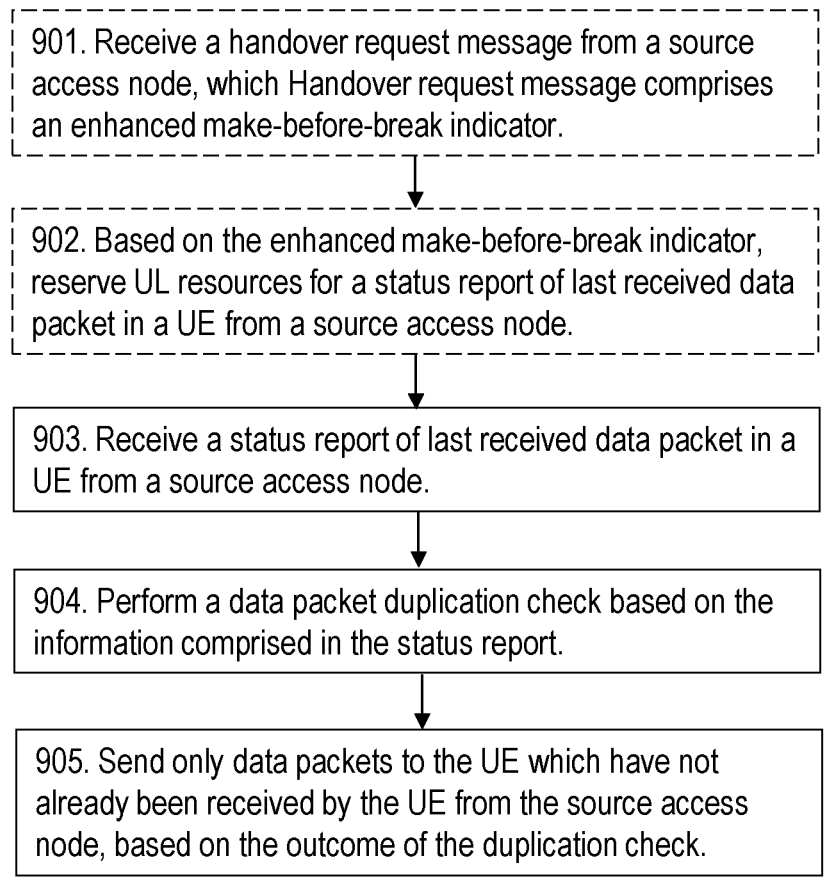
FIG. 9 is a flowchart depicting embodiments of a method in a target access node.

FIG. 9 shows an example method performed by the target access node 112 handling data packets such as perform data forwarding in a handover of a User Equipment, UE, 120 from a source cell 115, e.g. served by a source access node 111, to a target cell 116, e.g. served by a target access node 112 in a wireless communications network 100.

According to the example scenario, the UE 120 is served in the source cell 115 and moves towards the target cell 116. The UE 120 is engaged in an ongoing communication with the wireless communication network 100 in the source cell 115 and a handover to the target cell is needed. The method comprises one or more of the following actions:

Action 901,

This is an optional action. In some embodiments, the target access node 112 receives a handover request message from the source access node 111. The Handover request message may comprise an enhanced MBB indicator. This Action relates to step 502 described above.

Action 902,

This action is also optional. Based on the enhanced MBB indicator, the target access node 112 then may reserve UL resources for a status report of last received data packet in the UE 120 from the source access node 111. As mentioned above, the status report may e.g. be a PDCP status report. Early reservation of UL resources in the target access node 112 for the PDCP status report is advantageous since the UE 120 then do not need to request for UL resources for the PDCP status report during the random-access procedure, resources which may not be available in the target access node 112 at that point in time.

Action 903

The target access node 112 receives a status report from the UE 120. The status report relates to the last received data packet in the UE 120 from the source access node 111. As mentioned above, the status report may e.g. be a PDCP status report from the UE 120. The PDCP status report may e.g. comprise the PDCP SN of the last PDCP packet received from the source access node 111. This Action relates to step 511 described above. It should be noted that the wording "last received data packet" when used herein covers the wording "first missing data packet" with has an equal meaning as the "last received data packet", e.g. the PDCP SN of the first missing PDCP SDU.

Action 904

The target access node 112 then performs a data packet, e.g. PDCP, duplication check based on the information comprised in the status report, e.g. in the PDCP status report. This Action relates to step 512 described above.

In Action 905 the target access node 112 then sends only data packets, such as e.g. PDCP packets to the UE 120 which have not already been received by the UE 120 from the source access node 111, based on the outcome of the duplication check.

The methods will now be described and exemplified in more detail in the below text.

The PDCP duplication check performed by the target access node 112 may typically be based on the received status report, e.g. PDCP status report from the UE 120, e.g. as specified in the LTE PDCP layer specification TS 3GPP TS 36.323 and in the NR PDCP layer specification TS 3GPP TS 38.323.

In some alternatives, the status report informs the target access node 112 of the last data packets received by the UE 120 or, the first missing data packet. This means that all data packets up to and including this last received and/or first missing data packet have all been received by the UE 120 in the source cell 115. In this case the target access 35 node 112 discards those buffered packets up to and including the data packet indicated by the UE 120 in the status report and sends all buffered data packets with higher number than the data packet indicated to the UE 120.

According to an example, the status report such as the PDCP status report informs the target access node 112 of the last received data packet in the UE (120) from the source access node 111, such as the SN of the last PCDP SDU received by the UE 120 or, the first missing data packet in the UE 120 from the source access node 111, such as the PDCP SN of the first missing PDCP SDU, also known as the FMS field in the LTE PDCP protocol specification TS 36.323. This means that all data packets such as PDCP SDUs up to and including this SN have all been received by the UE 120 in the source cell. In this case the target access node 112 discards those buffered packets that have a SN up to and including the SN indicated by the UE 120 in the PDCP status report and sends all buffered PDCP SDUs with higher SN to the UE 120.

In another alternative, the status report such as the PDCP status report comprises in addition to the SN above, also a Bitmap field e.g. as specified in the LTE PDCP layer specification TS 3GPP TS 36.323, of length in bits equal to the number of PDCP SNs from and not including the first missing PDCP SDU up to and including the last out-of-sequence PDCP SDUs. Each bit represents a SN of a PDCP SDU, with SN value equal to FMS+bit position. A bit is e.g. set to '1' when the UE 120 has received the PDCP SDU with the corresponding SN in the source cell and '0' when it has not received it. The target access node 112 may use this bitmap to discard those buffered PDCP SDU which was indicated as already received by the UE 120, and it sends all other buffered PDCP SDUs to the UE 120.

As an alternative or complement to the status report such as the PDCP status report to avoid sending duplicate packets to the UE 120, the source access node 111 may optionally indicate to the target access node 112 every time the PDCP layer receives an indication from the RLC layer of successfully delivered data packets such as PDCP PDU(s).

Another option is that the source access node 111 does not indicate to the target access node 112 every time the PDCP layer receives such an indication from the RLC layer, but only every second time or every third time etc.

Yet another option is that the indications of successfully delivered data packets such as PDCP PDU(s) are sent to the target access node 112 when a certain number of data packets such as PDCP PDU(s) or a certain number of PDCP bytes have been forwarded since the last indication. The indication from the source access node 111 to the target access node 112 can be sent in the form of a SN Status Transfer (i.e. a XnAP control plane message or an X2AP control message) or a new XnAP message, or a new X2AP message, or in the form of a special packet inserted in the user plane between the source access node 111 and the target access node 112.

If used as a complement to the status report such as the PDCP status report from the UE 120, this mechanism will serve to inform the target access node 112 of data packets such as PDCP packets delivered to the UE 120 after the UE 120 has sent the status report such as the PDCP status report to the target access node 112. This may happen since the user plane communication between the source access node 111 and the UE 120 may continue until the UE 120 context is released in the source access node 111 (step 515) and/or the UE 120 disconnects from source access node 111 (step 513). Alternatively, the UE 120 may disconnect from the source access node 111 when it has sent the RRCConnectionReconfigurationComplete message with the PDCP status report.

Yet another option is that the target access node 112 may inform the source access node 111 that it can stop its communication with the UE 120. This may possibly be done by forwarding the status report such as the PDCP status report. The source access node 111 may respond with an indication of successfully received UL data packets such as PDCP packets, whose content has been delivered or will be delivered to the core network. This is to enable the target access node 112 to avoid sending duplicate UL data to the core network, if the UE 120 sends such UL PDCP packets to the target access node 112. Note that the source access node 111 may have successfully received UL data packets such as PDCP packets but not yet acknowledged them to the UE 120.

Yet another option is that source access node 111 includes such indications and/or reports about successfully received UL data packets such as PDCP packets in its indications to the target access node 112 about data packets such as PDCP packets successfully delivered to the UE 120.

The indications from the source access node 111 to the target access node 112 of successfully delivered data packets such as PDCP packets are also useful before the UE 120 synchronizes with the target access node 112 and sends the PDCP status report, because, based on the indications, the target access node 112 may delete already delivered and duplicated data packets such as PDCP packets from its buffer, thereby saving memory and saving time, since the target access node 112 can do some of the duplicate detection before it receives the status report such as the PDCP status report.

An additional option that may be considered in this context is that the source access node 111 may keep transmitting data to the UE, e.g. RLC packets, constituting partial PDCP packets, even after the target access node 112 has informed it that it can stop communicating with the UE 120 and/or after receiving the UE 120 context release request from the target access node 112. If such additional partial PDCP packet delivery is successful, the source access node 111 should preferably indicate this to the target access node 112 so that the target access node 112 can avoid sending duplicates of such PDCP packet(s). A rationale for this behavior is that it is more resource efficient to deliver the remainder of a partially delivered packet than to transmit the complete packet again.

In all the described embodiments, the source access node 111 and the target access node 112 may be the same access node, i.e. the source cell 115 and the target cell 116 are controlled by the same access node, i.e. an intra-access node handover, in which case the described inter-access node signaling becomes an intra-access node matter.

It should be understood that the message sequences illustrating the embodiments are examples of specific messages used herein. For example, the RRCConnectionReconfiguration message may alternatively be an RRCReconfiguration message in NR, or another type of "Handover Command" message. And for example, the RRCConnectionReconfigurationComplete message may alternatively be an RRCReconfigurationComplete message in NR or another type of "Handover Complete" message.

Below three example methods according to embodiments herein are described.

1. A method in a UE 120 to perform handover from a source access node 111 to a target access node 112, comprising:
    a. Receiving a handover command from the source access node 111
        i. Where the handover command contains an indicator instructing the UE 120 to send a PDCP status report
            1. Where the indicator is an enhanced make-before-break indicator
    b. Transmitting, as a response to the handover command, a PDCP status report to the target access node 112
        i. Where the PDCP status report is transmitted as a response to a received indicator in the received handover command from the source access node 111
            1. Where the indicator is an enhanced make-before-break indicator
        ii. Where the PDCP status report is transmitted during or immediately after the random access procedure in the target cell 116
            1. Where the PDCP status report is contained in an MAC uplink control PDU
            2. Where the PDCP status report is contained in an RRC message
        iii. Where the PDCP status report contains the PDCP SN of the last PDCP packet received from the source access node 111.
2. A method in a source access node 111 to perform data forwarding at handover of a UE 120 from a source access node 111 to a target access node 112, comprising:
    a. Transmitting a Handover request message to the target access node 112 i. Where the Handover request message contains an enhanced make-before-break indicator
b. Transmitting a handover command to the UE 120
i. Where the handover command contains an indication to send a PDCP status report.
3. A method in a target access node 112 to perform data forwarding at handover of a UE 120 from a source access node 111 to a target access node 112, comprising:
a. Receiving a Handover request message from the source access node 111
i. Where the Handover request message contains an enhanced make-before-break indicator
b. Based on the enhanced make-before-break indicator, reserve UL resources for the PDCP status report
c. Receiving a PDCP status report from the UE 120
i. Where the PDCP status report contains the PDCP SN of the last PDCP packet received from the source access node 111
d. Using the information included in the PDCP status report to perform a PDCP duplication check
e. As an outcome of the duplication check, avoid sending PDCP packets to the UE 120 which were already received by the UE 120 from the source access node 111.

Figure 10A:
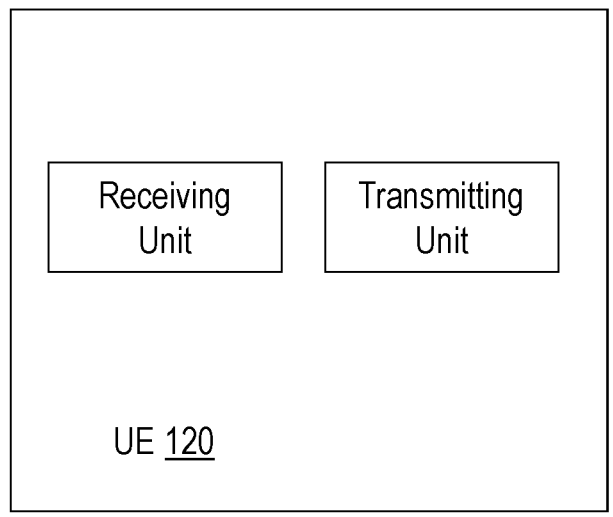
FIGS. 10 *a* and *b* are schematic block diagrams illustrating embodiments of a user equipment.
Figure 10B:
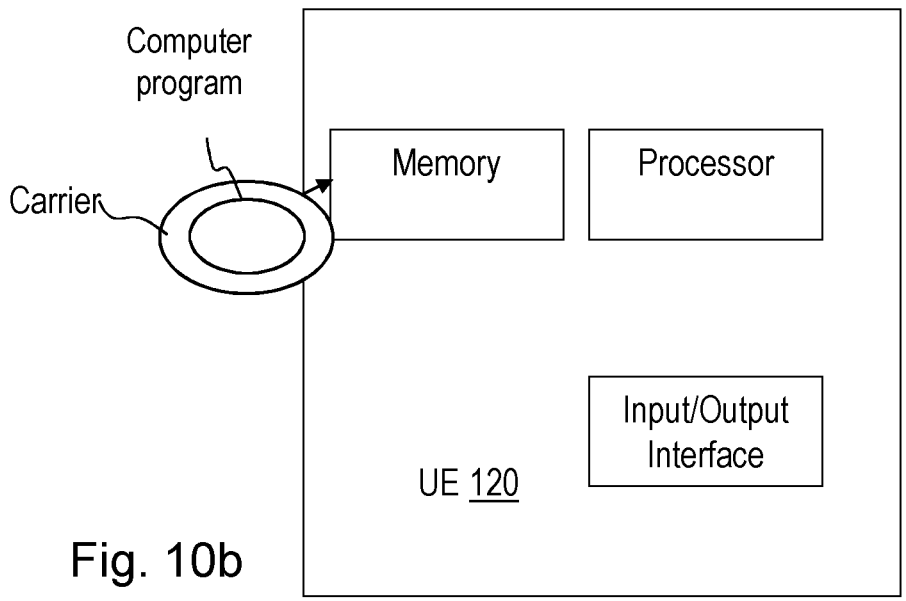
Figure 11A:
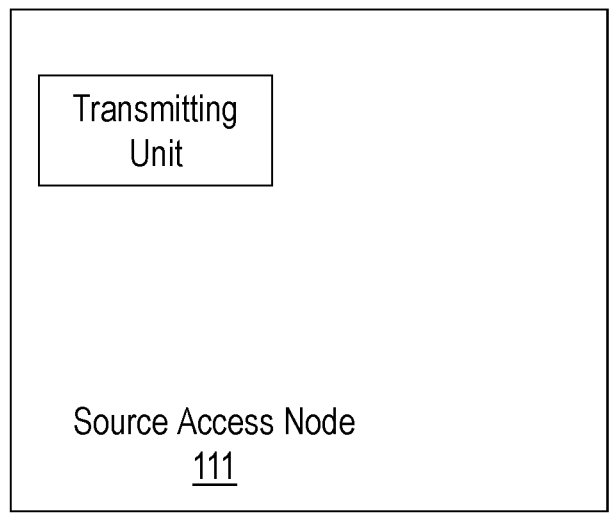
FIGS. 11 *a* and *b* are schematic block diagrams illustrating embodiments of a source access node.
Figure 11B:
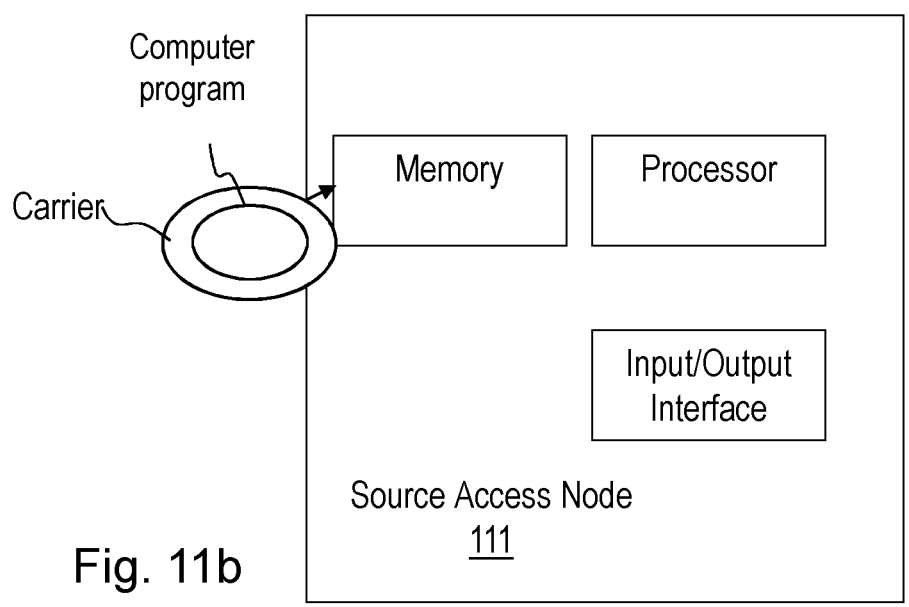
Figure 12A:
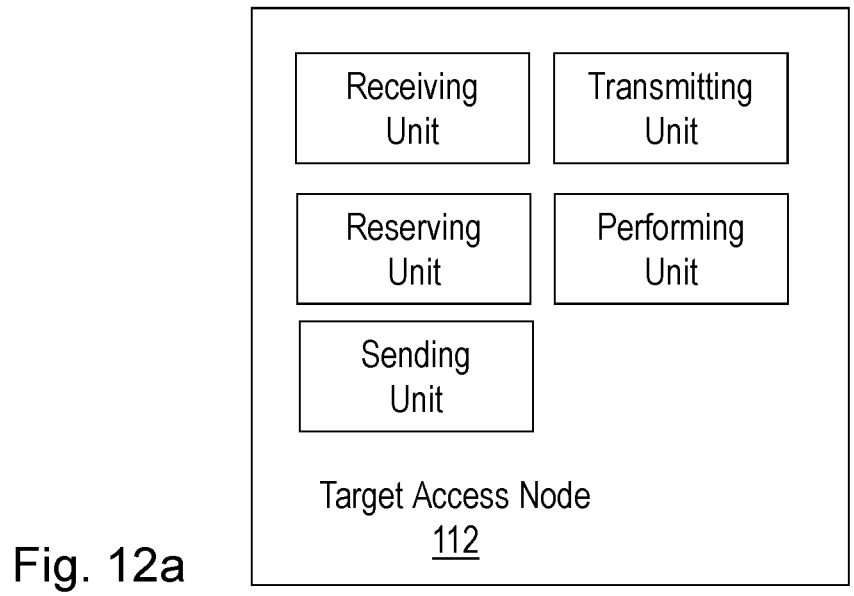
FIGS. 12 *a* and *b* are schematic block diagrams illustrating embodiments of a target access node.
Figure 12B:
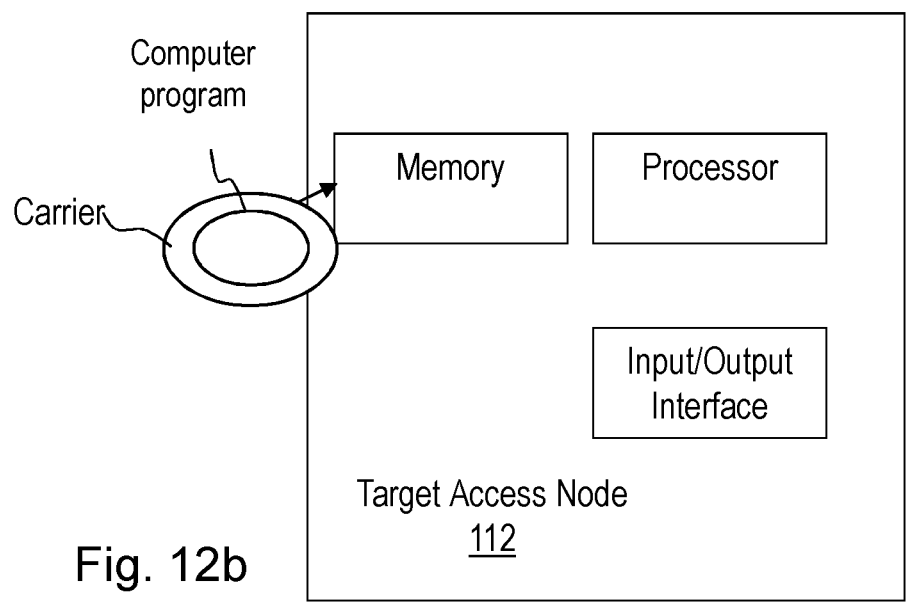

FIGS. 10a and 10b shows an example of the UE 120, FIGS. 11a and 11b shows an example of the source access node 111 and FIGS. 12a and 12b shows an example of the target access node 112.

The source access node 111, the target access node 112 and the UE 120 may comprise a respective input and output interface configured to communicate with each other, see FIGS. 10b, 11b and 12b. The input and output interface may comprise a wireless receiver (not shown) and a wireless transmitter (not shown).

The UE 120 may further comprise a receiving unit and a transmitting unit. The source access node 111 may further comprise a transmitting unit. The target access node 112 may further comprise a receiving unit, a transmitting unit, a reserving unit, a preforming unit and a sending unit.

The embodiments herein may be implemented through a respective processor or one or more processors, such as the processor of a processing circuitry in the source access node 111, the target access node 112, and the UE 120 depicted in FIGS. 10, 11 and 12 together with computer program code for performing the functions and actions of the embodiments herein. The program code mentioned above may also be provided as a computer program product, for instance in the form of a data carrier carrying computer program code for performing the embodiments herein when being loaded into the source access node 111, the target access node 112 and the UE 120. One such carrier may be in the form of a CD ROM disc. It is however feasible with other data carriers such as a memory stick. The computer program code may furthermore be provided as pure program code on a server and downloaded to the source access node 111, the target access node 112 and the UE 120.

The source access node 111, the target access node 112 and the UE 120 may further comprise respective a memory comprising one or more memory units. The memory comprises instructions executable by the processor in the source access node 111, the target access node 112 and the UE 120. The memory is arranged to be used to store e.g. information, data, configurations, and applications to perform the methods herein when being executed in the source access node 111, the target access node 112 and the UE 120.

In some embodiments, a respective computer program comprises instructions, which when executed by the at least one processor, cause the at least one processor of the source access node 111, the target access node 112 and the UE 120 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the source access node 111, the target access node 112 and the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-22 are described below. The following embodiments refer among other things to FIG. 6, 7, 8, 9, 10a-b, 11a-b and 12a-b.

Embodiment 1

A method performed by a User Equipment, UE, 120 e.g. for assisting a target access node 112 to handling data packets in a handover from a source cell 115, e.g. served by a source access node 111, to a target cell 116, e.g. served by a target access node 112 in a wireless communications network 100, the method comprising:
e.g. receiving 701 a handover command from the source access node 111,
when the handover is decided, e.g. a handover command is received, transmitting 702 to the target access node 112 e.g. as a response to handover command, a status report of the last received data packet from the source access node 111, e.g. a Packet Data Convergence Protocol, PDCP, status report, which status report assists the target access node 112 to perform a data packet duplication check, e.g. to avoid sending data packets to the UE 120 in the target cell 116 that was already sent in the source cell 115.

Embodiment 2

The method according to embodiment 1, wherein the handover command comprises an indicator instructing the UE 120 to send to the target access node 112 a status report of the last received data packet from the source access node 111, e.g. a Packet Data Convergence Protocol, PDCP, status report, which indicator e.g. is an enhanced make-before-break indicator.

Embodiment 3

The method according to any of the embodiments 1-2, wherein the status report of the last received data packet from the source access node 111 such as e.g. the PDCP status report, is transmitted as a response to a received indicator in the received handover command from the source access node 111, which indicator e.g. is an enhanced make-before-break indicator.

Embodiment 4

The method according to any of the embodiments 1-2, wherein the status report of the last received data packet from the source access node 111 such as e.g. the PDCP status report, is transmitted during or immediately after a random access procedure in the target cell 116.

Embodiment 5

The method according to embodiment 4, wherein the status report of the last received data packet from the source access node 111 such as e.g. the PDCP status report, is comprised in any one out of: a MAC uplink control PDU or an RRC message.

Embodiment 6

The method according to any of the embodiments 1-5, wherein the status report of the last received data packet from the source access node 111 such as e.g. the PDCP status report, comprises the PDCP SN of the last PDCP packet received from the source access node 111.

Embodiment 7

A computer program comprising instructions, which when executed by a processor, causes the processor to perform actions according to any of the embodiments 1-6.

Embodiment 8

A carrier comprising the computer program of embodiment 7, wherein the carrier is one of an electronic signal, an optical signal, an electromagnetic signal, a magnetic signal, an electric signal, a radio signal, a microwave signal, or a computer-readable storage medium.

Embodiment 9

A method performed by a source access node 111 e.g. for assisting a target access node 112 in handling data packets such as perform data forwarding in a handover of a User Equipment, UE, 120 from a source cell 115, e.g. served by a source access node 111, to a target cell 116, e.g. served by a target access node 112 in a wireless communications network 100, the method comprising:
- e.g. transmitting 801 a Handover request message to the target access node 112, which Handover request message comprises an enhanced make-before-break, MBB, indicator,
- when decided to perform the handover, transmitting 802 a handover command to the UE 120, which handover command comprises an instruction to send to the target access node 112 a status report of the last received data packet in the UE 120 from the source access node 111, such as e.g. an indication to send PDCP status, which status report assists the target access node 112 to perform a data packet duplication check, e.g. to avoid sending data packets to the UE 120 in the target cell 116 that was already sent in the source cell 115.

Embodiment 10

A computer program comprising instructions, which when executed by a processor, causes the processor to perform actions according to embodiment 9.

Embodiment 11

A carrier comprising the computer program of embodiment 10, wherein the carrier is one of an electronic signal, an optical signal, an electromagnetic signal, a magnetic signal, an electric signal, a radio signal, a microwave signal, or a computer-readable storage medium.

Embodiment 12

A method performed by a target access node 112 handling data packets such as perform data forwarding in a handover of a User Equipment, UE, 120 from a source cell 115, e.g. served by a source access node 111, to a target cell 116, e.g. served by a target access node 112 in a wireless communications network 100, the method comprising:
- e.g. receiving 901 a handover request message from the source access node 111, which Handover request message comprises an enhanced make-before-break, MBB, indicator,
- e.g. based on the enhanced make-before-break, MBB, indicator reserving 902, UL resources for a status report of last received data packet in the UE 120 from the source access node 111, such as e.g. a PDCP status report from the UE 120,
- receiving 903 a status report of last received data packet in the UE 120 from the source access node 111, such as e.g. a PDCP status report from the UE 120, which PDCP status report e.g. comprises the PDCP SN of the last PDCP packet received from the source access node 111.
- performing 904 a data packet, e.g. PDCP, duplication check based on the information comprised in the status report, e.g. in the PDCP status report,
- sending 905 only data packets, such as e.g. PDCP packets to the UE 120 which have not already been received by the UE 120 from the source access node 111, based on the outcome of the duplication check.

Embodiment 13

A computer program comprising instructions, which when executed by a processor, causes the processor to perform actions according to embodiment 12.

Embodiment 14

A carrier comprising the computer program of embodiment 13, wherein the carrier is one of an electronic signal, an optical signal, an electromagnetic signal, a magnetic signal, an electric signal, a radio signal, a microwave signal, or a computer-readable storage medium.

Embodiment 15

A User Equipment, UE, 120 e.g. for assisting a target access node 112 to handling data packets in a handover from a source cell 115, e.g. served by a source access node 111, to a target cell 116, e.g. served by a target access node 112 in a wireless communications network 100, the UE 120 being configured to:

receive a handover command from the source access node 111, e.g. by means of a receiving unit in the UE 120, when the handover is decided, e.g. a handover command is received, transmit, e.g. by means of a transmitting unit in the UE 120, to the target access node 112 e.g. as a response to handover command, a status report of the last received data packet from the source access node 111, e.g. a Packet Data Convergence Protocol, PDCP, status report, which status report is adapted to assist the target access node 112 to perform a data packet duplication check, e.g. to avoid sending data packets to the UE 120 in the target cell 116 that was already sent in the source cell 115.

Embodiment 16

The UE 120 according to embodiment 15, wherein the handover command is adapted to comprise an indicator instructing the UE 120 to send to the target access node 112 a status report of the last received data packet from the source access node 111, e.g. a Packet Data Convergence Protocol, PDCP, status report, which indicator e.g. is an enhanced make-before-break indicator.

Embodiment 17

The UE 120 according to any of the embodiments 15-16, wherein the status report of the last received data packet from the source access node 111 such as e.g. the PDCP status report, is adapted to be transmitted as a response to a received indicator in the received handover command from the source access node 111, which indicator e.g. is an enhanced make-before-break indicator.

Embodiment 18

The UE 120 according to any of the embodiments 15-16, wherein the status report of the last received data packet from the source access node 111 such as e.g. the PDCP status report, is adapted to be transmitted during or immediately after a random access procedure in the target cell 116.

Embodiment 19

The UE 120 according to embodiment 18, wherein the status report of the last received data packet from the source access node 111 such as e.g. the PDCP status report, is adapted to be comprised in any one out of: a MAC uplink control PDU or an RRC message.

Embodiment 20

The UE 120 according to any of the embodiments 15-19, wherein the status report of the last received data packet from the source access node 111 such as e.g. the PDCP status report, is adapted to comprise the PDCP SN of the last PDCP packet received from the source access node 111.

Embodiment 21

A source access node 111 e.g. for assisting a target access node 112 in handling data packets such as perform data forwarding in a handover of a User Equipment, UE, 120 from a source cell 115, e.g. served by a source access node 111, to a target cell 116, e.g. served by a target access node 112 in a wireless communications network 100, the source access node 111 being configured to:

e.g. transmit a Handover request message to the target access node 112, e.g. by means of a transmitting unit in the source access node 111, which Handover request message is adapted to comprise an enhanced make-before-break, MBB, indicator, when decided to perform the handover, transmit, e.g. by means of the transmitting unit in the source access node 111, a handover command to the UE 120, which handover command is adapted to comprise an instruction to send to the target access node 112 a status report of the last received data packet in the UE 120 from the source access node 111, such as e.g. an indication to send PDCP status, which status report is adapted to assist the target access node 112 to perform a data packet duplication check, e.g. to avoid sending data packets to the UE 120 in the target cell 116 that was already sent in the source cell 115.

Embodiment 22

A target access node 112 for handling data packets such as perform data forwarding in a handover of a User Equipment, UE, 120 from a source cell 115, e.g. served by a source access node 111, to a target cell 116, e.g. served by a target access node 112 in a wireless communications network 100, the target access node 112 being configured to:

e.g. receive a handover request message from the source access node 111, e.g. by means of a receiving unit in the target access node 112, which Handover request message is adapted to comprise an enhanced make-before-break, MBB, indicator, e.g. based on the enhanced make-before-break, MBB, indicator reserve, e.g. by means of a reserving unit in the target access node 112, UL resources for a status report of last received data packet in the UE 120 from the source access node 111, such as e.g. a PDCP status report from the UE 120, receive, e.g. by means of the receiving unit in the target access node 112, a status report of last received data packet in the UE 120 from the source access node 111, such as e.g. a PDCP status report from the UE 120, which PDCP status report is adapted to e.g. comprise the PDCP SN of the last PDCP packet received from the source access node 111, perform, e.g. by means of a performing unit in the target access node 112, a data packet, e.g. PDCP, duplication check based on the information comprised in the status report, e.g. in the PDCP status report.

send, e.g. by means of a sending unit in the target access node 112, only data packets, such as e.g. PDCP packets to the UE 120 which have not already been received by the UE 120 from the source access node 111, based on the outcome of the duplication check.

Below, see variants of embodiments 15-22.

Embodiment 15

A User Equipment, UE, 120 e.g. for assisting a target access node 112 to handling data packets in a handover from a source cell 115, e.g. served by a source access node 111, to a target cell 116, e.g. served by a target access node 112 in a wireless communications network 100, the UE 120 comprising a processor and a memory containing instructions executable by the processor whereby the UE 120 is configured to:

receive a handover command from the source access node 111, e.g. by means of a receiving unit in the UE 120, when the handover is decided, e.g. a handover command is received, transmit, e.g. by means of a transmitting unit in the UE 120, to the target access node 112 e.g. as a response to handover command, a status report of the last received data packet from the source access node 111, e.g. a Packet Data Convergence Protocol, PDCP, status report, which status report is adapted to assist the target access node 112 to perform a data packet duplication check, e.g. to avoid sending data packets to the UE 120 in the target cell 116 that was already sent in the source cell 115.

Embodiment 16

The UE 120 according to embodiment 15, wherein the handover command is adapted to comprise an indicator instructing the UE 120 to send to the target access node 112 a status report of the last received data packet from the source access node 111, e.g. a Packet Data Convergence Protocol, PDCP, status report, which indicator e.g. is an enhanced make-before-break indicator.

Embodiment 17

The UE 120 according to any of the embodiments 15-16, wherein the status report of the last received data packet from the source access node 111 such as e.g. the PDCP status report, is adapted to be transmitted as a response to a received indicator in the received handover command from the source access node 111, which indicator e.g. is an enhanced make-before-break indicator.

Embodiment 18

The UE 120 according to any of the embodiments 15-16, wherein the status report of the last received data packet from the source access node 111 such as e.g. the PDCP status report, is adapted to be transmitted during or immediately after a random access procedure in the target cell 116.

Embodiment 19

The UE 120 according to embodiment 18, wherein the status report of the last received data packet from the source access node 111 such as e.g. the PDCP status report, is adapted to be comprised in any one out of: a MAC uplink control PDU or an RRC message.

Embodiment 20

The UE 120 according to any of the embodiments 15-19, wherein the status report of the last received data packet from the source access node 111 such as e.g. the PDCP status report, is adapted to comprise the PDCP SN of the last PDCP packet received from the source access node 111.

Embodiment 21

A source access node 111 e.g. for assisting a target access node 112 in handling data packets such as perform data forwarding in a handover of a User Equipment, UE, 120 from a source cell 115, e.g. served by a source access node 111, to a target cell 116, e.g. served by a target access node 112 in a wireless communications network 100, the source access node 111 comprising a processor and a memory containing instructions executable by the processor whereby the source access node 111 is configured to:

e.g. transmit a Handover request message to the target access node 112, e.g. by means of a transmitting unit in the source access node 111, which Handover request message is adapted to comprise an enhanced make-before-break, MBB, indicator, when decided to perform the handover, transmit, e.g. by means of the transmitting unit in the source access node 111, a handover command to the UE 120, which handover command is adapted to comprise an instruction to send to the target access node 112 a status report of the last received data packet in the UE 120 from the source access node 111, such as e.g. an indication to send PDCP status, which status report is adapted to assist the target access node 112 to perform a data packet duplication check, e.g. to avoid sending data packets to the UE 120 in the target cell 116 that was already sent in the source cell 115.

Embodiment 22

A target access node 112 for handling data packets such as perform data forwarding in a handover of a User Equipment, UE, 120 from a source cell 115, e.g. served by a source access node 111, to a target cell 116, e.g. served by a target access node 112 in a wireless communications network 100, the target access node 112 comprising a processor and a memory containing instructions executable by the processor whereby the target access node 112 is configured to:

e.g. receive a handover request message from the source access node 111, e.g. by means of a receiving unit in the target access node 112, which Handover request message is adapted to comprise an enhanced make-before-break, MBB, indicator, e.g. based on the enhanced make-before-break, MBB, indicator reserve, e.g. by means of a reserving unit in the target access node 112, UL resources for a status report of last received data packet in the UE 120 from the source access node 111, such as e.g. a PDCP status report from the UE 120, receive, e.g. by means of the receiving unit in the target access node 112, a status report of last received data packet in the UE 120 from the source access node 111, such as e.g. a PDCP status report from the UE 120, which PDCP status report is adapted to e.g. comprise the PDCP SN of the last PDCP packet received from the source access node 111, perform, e.g. by means of a performing unit in the target access node 112, a data packet, e.g. PDCP, duplication check based on the information comprised in the status report, e.g. in the PDCP status report.

send, e.g. by means of a sending unit in the target access node 112, only data packets, such as e.g. PDCP packets to the UE 120 which have not already been received by the UE 120 from the source access node 111, based on the outcome of the duplication check.

Figure 13:
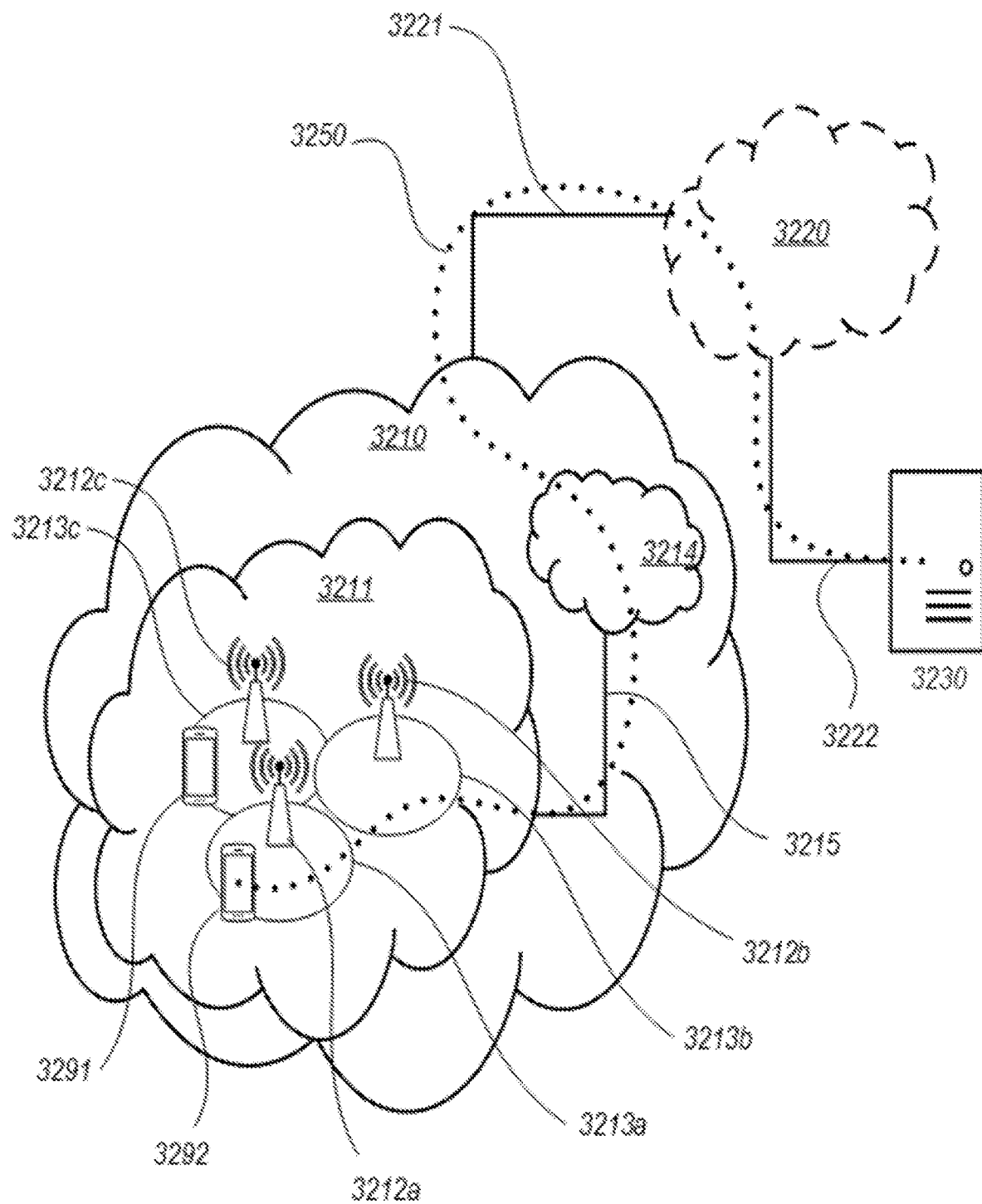
FIG. 13 schematically illustrates a telecommunication network connected via an intermediate network to a host computer.

With reference to FIG. 13, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target access node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE)

such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
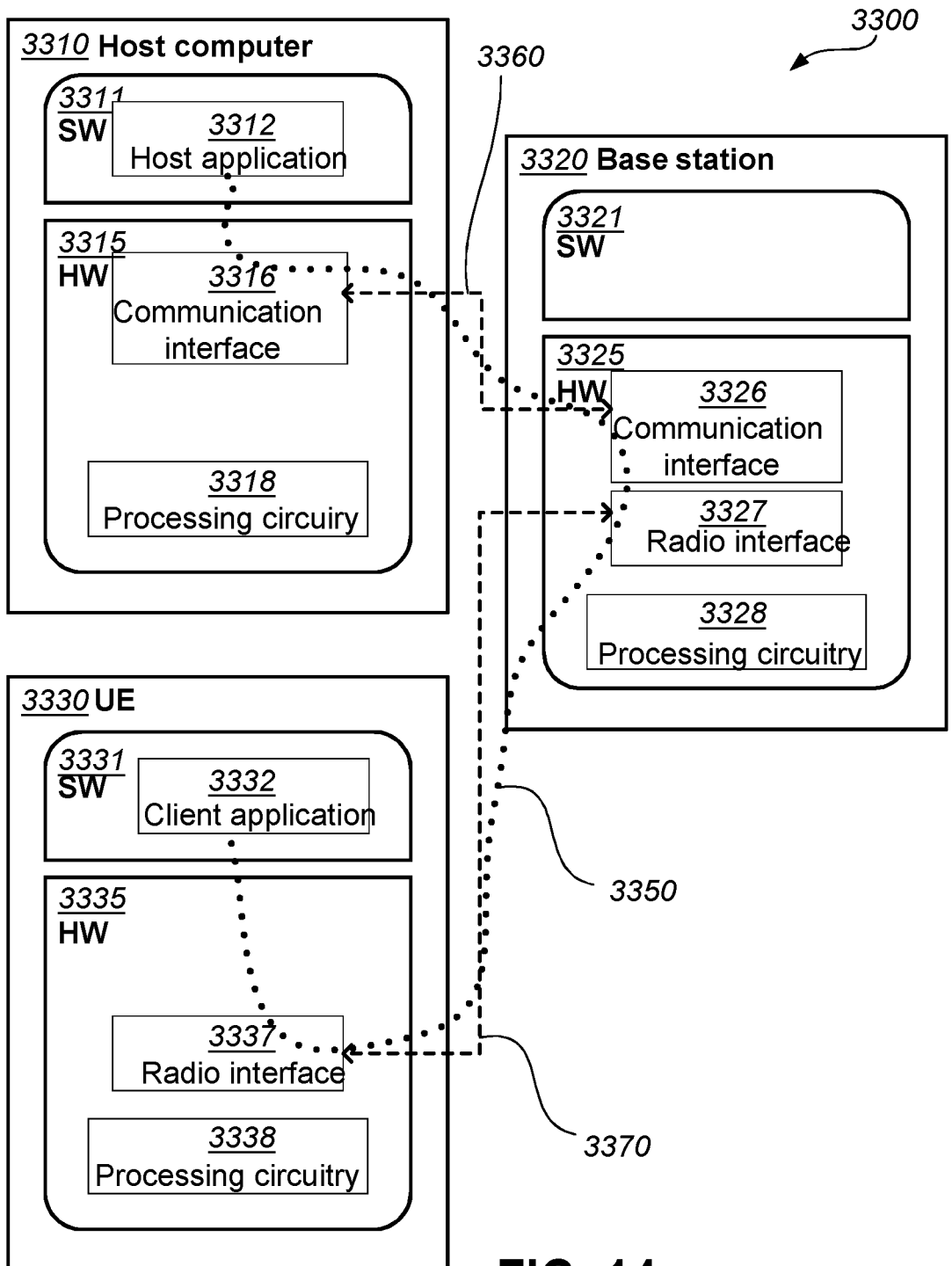
FIG. 14 is a generalized block diagram of a host computer communicating via a base station with a user equipment over a partially wireless connection.

It is noted that the host computer 3310, base station 3320 and UE 3330 illustrated in FIG. 14 may be identical to the host computer 3230, one of the base stations 3212*a*, 3212*b*, 3212*c* and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 13 and FIG. 14. For simplicity of the present disclosure, only drawing references to FIG. 15 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 16 is a flowchart illustrating a method implemented in a communication system, in accordance with one embodiment. The communication system includes a host computer, a base station such as a AP STA, and a UE such as a Non-AP STA which may be those described with reference to FIG. 13 and FIG. 14. For simplicity of the present disclosure, only drawing references to FIG. 16 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 17:
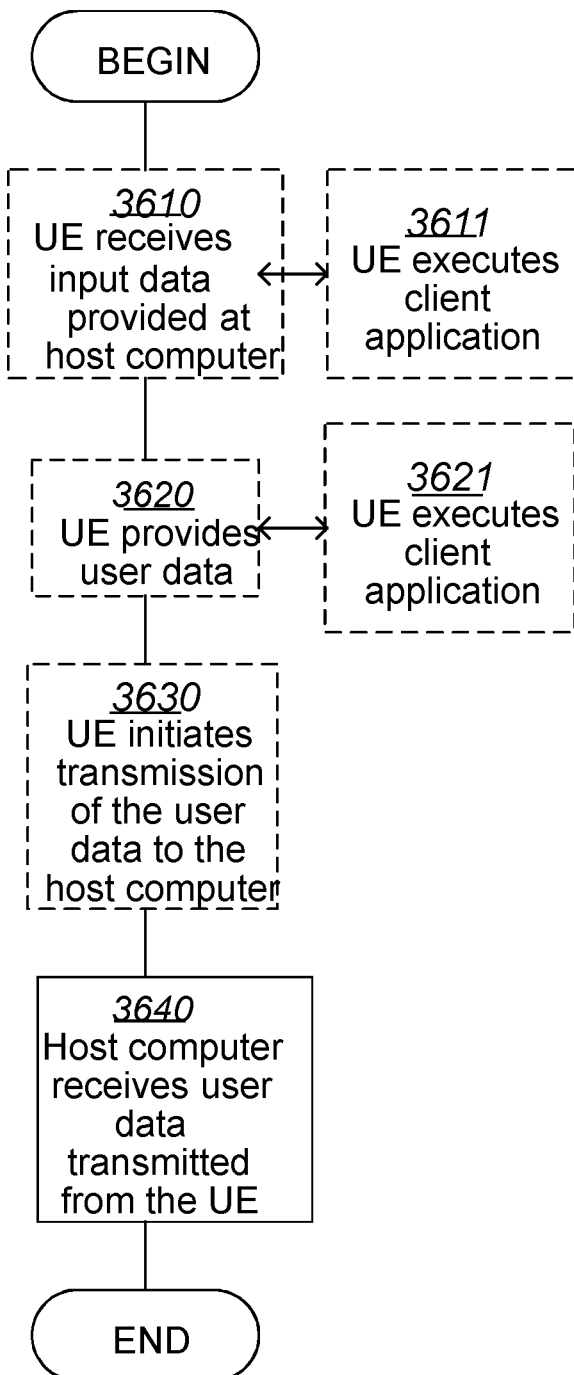

FIG. 17 is a flowchart illustrating a method implemented in a communication system, in accordance with one embodiment. The communication system includes a host computer, a base station such as a AP STA, and a UE such as a Non-AP STA which may be those described with reference to FIG. 13 and FIG. 14. For simplicity of the present disclosure, only drawing references to FIG. 17 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 18:
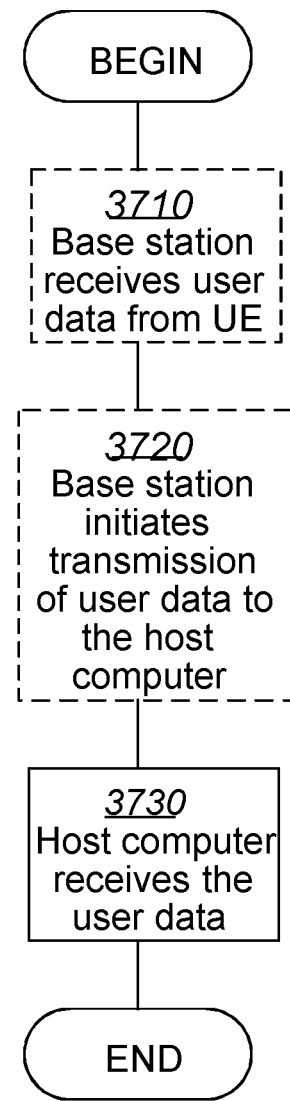

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 18 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviations

Abbreviation Explanation

5GS 5G System
5GC 5G Core network

AMF Access and Mobility Management Function
CHO Conditional Handover
C-RNTI Cell RNTI
DL Downlink
eNB Evolved Node B
E-UTRAN Evolved Universal Terrestrial Access Network
EPC Evolved Packet Core network
gNB 5G Node B
HO Handover
LTE Long-term Evolution
MBB Make-before-break
NCC Next Hop Chaining Counter
NG-RAN Next Generation Radio Access Network
NR New Radio
PDCP Packet Data Convergence Protocol
RA Random Access
RAR Random Access Response
RNTI Radio Network Temporary Identifier
RRC Radio Resource Control
Rx Receive
SDU Service Data Unit
SN Sequence Number
Tx Transmit
UE User Equipment
UL Uplink
UPF User Plane Function

The invention claimed is:

1. A method performed by a target access node for handling data packets in a handover of a User Equipment, UE, from a source cell served by a source access node, to a target cell served by the target access node, in a wireless communications network, the method comprising:
   receiving a status report of last received data packet in the UE from the source access node;
   performing a data packet duplication check based on the information comprised in the status report;
   sending to the UE, only data packets which have not already been received by the UE from the source access node, based on the outcome of the duplication check;
   receiving a handover request message from a source access node serving the source cell, which handover request message comprises an enhanced make-before-break, MBB, indicator; and
   based on the enhanced MBB indicator, reserving uplink, UL, resources for a status report of last received data packet in the UE from the source access node.

2. A method performed by a User Equipment, UE, for assisting a target access node to handling data packets in a handover from a source cell, served by a source access node, to a target cell served by a target access node in a wireless communications network, the method comprising:
   when the handover is decided, transmitting to the target access node, a status report of the last received data packet from the source access node, which status report assists the target access node to perform a data packet duplication check to avoid sending data packets to the UE in the target cell that was already sent in the source cell,
   the target access node receiving a handover request message from a source access node serving the source cell, which handover request message comprises an enhanced make-before-break, MBB, indicator, and, based on the enhanced MBB indicator, reserved uplink, UL, resources for a status report of last received data packet in the UE from the source access node.

3. The method according to claim 2, further comprising:
   receiving a handover command from the source access node, wherein the handover command comprises an indicator instructing the UE to send to the target access node a status report of the last received data packet from the source access node.

4. The method according to claim 3, wherein the status report of the last received data packet from the source access node is transmitted as a response to a received indicator in the received handover command from the source access node.

5. The method according to claim 3, wherein the status report of the last received data packet from the source access node is one of transmitted during and immediately after a random access procedure in the target cell.

6. The method according to claim 5, wherein the status report of the last received data packet from the source access node, is comprised in any one out of: a MAC uplink control PDU and an RRC message.

7. The method according to claim 3, wherein the status report of the last received data packet from the source access node comprises the PDCP SN of the last PDCP packet received from the source access node.

8. The method according to claim 2, wherein the status report of the last received data packet from the source access node is transmitted as a response to a received indicator in the received handover command from the source access node.

9. The method according to claim 2, wherein the status report of the last received data packet from the source access node is transmitted one of during and immediately after a random access procedure in the target cell.

10. The method according to claim 9, wherein the status report of the last received data packet from the source access node, is comprised in any one out of: a MAC uplink control PDU and an RRC message.

11. The method according to claim 2, wherein the status report of the last received data packet from the source access node comprises the PDCP SN of the last PDCP packet received from the source access node.

12. A target access node for handling data packets in a handover of a User Equipment, UE, from a source cell served by a source access node, to a target cell served by the target access node in a wireless communications network, the target access node being configured to:
   receive a status report of last received data packet in the UE from the source access node;
   perform a data packet duplication check based on the information comprised in the status report;
   send to the UE, only data packets which have not already been received by the UE from the source access node, based on the outcome of the duplication check;
   receive a handover request message from the source access node, which handover request message comprises an enhanced make-before-break, MBB, indicator; and
   based on the enhanced MBB indicator, reserve uplink, UL, resources for a status report of last received data packet in the UE from the source access node.

13. A User Equipment, UE, for assisting a target access node to handling data packets in a handover from a source cell served by a source access node, to a target cell served by a target access node in a wireless communications network, the UE being configured to:
   when the handover is decided, transmit, to the target access node, a status report of the last received data packet from the source access node, which status report is adapted to assist the target access node to perform a data packet duplication check to avoid sending data packets to the UE in the target cell that was already sent in the source cell, the target access node receiving a handover request message from a source access node serving the source cell, which handover request message comprises an enhanced make-before-break, MBB, indicator, and, based on the enhanced MBB indicator, reserved uplink, UL, resources for a status report of last received data packet in the UE from the source access node.

14. The UE according to claim 13, being configured to:
receive a handover command from the source access node, wherein the handover command includes an indicator instructing the UE to send to the target access node a status report of the last received data packet from the source access node.

15. The UE according to claim 13, wherein the status report of the last received data packet from the source access node is adapted to be transmitted as a response to a received indicator in the received handover command from the source access node.

16. The UE according to claim 13, wherein the status report of the last received data packet from the source access node is adapted to be transmitted one of during and immediately after a random access procedure in the target cell.

17. The UE according to claim 16, wherein the status report of the last received data packet from the source access node is comprised in any one out of: a MAC uplink control PDU and an RRC message.

18. The UE according to claim 13, wherein the status report of the last received data packet from the source access node is adapted to comprise the PDCP SN of the last PDCP packet received from the source access node.

* * * * *